(12) United States Patent
Budaragin et al.

(10) Patent No.: US 9,879,815 B2
(45) Date of Patent: Jan. 30, 2018

(54) METHODS FOR PROVIDING PROPHYLACTIC SURFACE TREATMENT FOR FLUID PROCESSING SYSTEMS AND COMPONENTS THEREOF

(71) Applicant: C3 INTERNATIONAL, LLC, Alpharetta, GA (US)

(72) Inventors: Leonid V. Budaragin, Moscow (RU); Mark A. Deininger, Roswell, GA (US); Mikhail Pozvonkov, Cumming, GA (US); Norman H. Garrett, Atlanta, GA (US); D. Morgan Spears, II, Atlanta, GA (US)

(73) Assignee: C3 International, LLC, Alpharetta, GA (US)

( * ) Notice: Subject to any disclaimer, the term of this patent is extended or adjusted under 35 U.S.C. 154(b) by 0 days.

(21) Appl. No.: 15/437,036

(22) Filed: Feb. 20, 2017

(65) Prior Publication Data
US 2017/0159870 A1    Jun. 8, 2017

Related U.S. Application Data

(63) Continuation of application No. 15/138,741, filed on Apr. 26, 2016, now Pat. No. 9,625,079, which is a
(Continued)

(51) Int. Cl.
*C23C 22/83*     (2006.01)
*C09D 5/08*      (2006.01)
(Continued)

(52) U.S. Cl.
CPC .............. *F16L 58/04* (2013.01); *C09D 5/084* (2013.01); *C23C 8/02* (2013.01); *C23C 8/34* (2013.01);
(Continued)

(58) Field of Classification Search
CPC ............ C23C 18/1216; C23C 18/1241; C23C 18/127; C23C 22/74; C23C 22/83
See application file for complete search history.

(56) References Cited

U.S. PATENT DOCUMENTS 2,048,912 A    7/1936    Liska et al.
2,141,477 A    12/1938   Loesch
(Continued)

FOREIGN PATENT DOCUMENTS

DE    295148     10/1991
EP    1088908     4/2001
(Continued)

OTHER PUBLICATIONS

Fujishima et al., 70 Pure Appl. Chem. (1998) 2177-87.
(Continued)

*Primary Examiner* — Dah-Wei D Yuan
*Assistant Examiner* — Kristen A Dagenais
(74) *Attorney, Agent, or Firm* — Thrive IP®; Jeremy M. Stipkala

(57) ABSTRACT

The invention relates to a method for creating a diffused thin film surface treatments on one or more interior surfaces of closed or partially closed fluid transport or processing systems providing improved surface prophylaxis against fouling. The method involves contacting the interior surfaces to be treated with a metal compound composition, and converting the metal compound composition to metal oxide for example by heating the surfaces to the desired temperature after all or a part of the system has been assembled. Embodiments of the present invention can be performed in situ on existing fluid processing or transport systems, which minimizes the disruption to the surface treatment created by welds, joints, flanges, and damage caused by or during the system assembly process.

20 Claims, 7 Drawing Sheets
(6 of 7 Drawing Sheet(s) Filed in Color)

Related U.S. Application Data continuation of application No. 12/444,519, filed as application No. PCT/US2007/081230 on Oct. 12, 2007, now Pat. No. 9,353,434.

(60) Provisional application No. 60/851,354, filed on Oct. 12, 2006.

(51) Int. Cl.

| | |
|---|---|
| F16L 58/04 | (2006.01) |
| C23C 8/02 | (2006.01) |
| C23C 8/34 | (2006.01) |
| C23C 8/80 | (2006.01) |
| C23C 18/12 | (2006.01) |
| C23C 22/74 | (2006.01) |
| C23C 26/00 | (2006.01) |
| C23C 22/82 | (2006.01) |

(52) U.S. Cl.
CPC ............ *C23C 8/80* (2013.01); *C23C 18/127* (2013.01); *C23C 18/1216* (2013.01); *C23C 18/1241* (2013.01); *C23C 22/74* (2013.01); *C23C 22/82* (2013.01); *C23C 22/83* (2013.01); *C23C 26/00* (2013.01); *Y02T 50/67* (2013.01)

(56) References Cited

U.S. PATENT DOCUMENTS

| | | |
|---|---|---|
| 2,334,294 A | 11/1943 | Stevens |
| 2,470,796 A | 5/1949 | Stromquist |
| 2,530,110 A | 11/1950 | Woodyard |
| 2,551,722 A | 5/1951 | Bowen |
| 2,631,356 A | 3/1953 | Sparks et al. |
| 2,792,807 A | 5/1957 | Cummings |
| 2,800,875 A | 7/1957 | Jewell |
| 3,516,385 A | 6/1970 | Walling |
| 3,679,712 A | 7/1972 | Firestone |
| 3,947,292 A | 3/1976 | Jackovitz et al. |
| 4,588,575 A | 5/1986 | David |
| 4,686,201 A | 8/1987 | Porter et al. |
| 4,687,567 A | 8/1987 | Porter et al. |
| 4,772,905 A * | 9/1988 | Yoshimura ............... G03C 8/50 396/527 |
| 4,774,905 A * | 10/1988 | Nobis ....................... B05C 7/02 118/304 |
| 4,925,886 A | 5/1990 | Atkins et al. |
| 5,015,358 A | 5/1991 | Reed et al. |
| 5,021,398 A | 6/1991 | Sharma et al. |
| 5,028,467 A | 7/1991 | Maruyama et al. |
| 5,073,410 A | 12/1991 | Paz-Pujalt |
| 5,230,842 A | 7/1993 | Munde |
| 5,395,896 A | 3/1995 | Moriya et al. |
| 5,413,642 A | 5/1995 | Alger |
| 5,423,285 A | 6/1995 | Paz De Araujo et al. |
| 5,468,679 A | 11/1995 | Paz De Araujo et al. |
| 5,472,795 A | 12/1995 | Aita |
| 5,496,415 A | 3/1996 | Barnham |
| 5,518,603 A | 5/1996 | Furuhashi et al. |
| 5,645,634 A | 7/1997 | Ogi et al. |
| 5,741,372 A | 4/1998 | Gugel |
| 5,805,973 A | 9/1998 | Coffinberry et al. |
| 5,817,436 A | 10/1998 | Nishijima et al. |
| 5,919,519 A | 7/1999 | Tallis |
| 5,952,769 A | 9/1999 | Budaragin |
| 5,968,463 A | 10/1999 | Shelef et al. |
| 5,990,416 A | 11/1999 | Windisch, Jr. et al. |
| 6,079,074 A | 6/2000 | Ellett |
| 6,117,581 A | 9/2000 | Shelef |
| 6,127,202 A | 10/2000 | Kapur et al. |
| 6,153,160 A | 11/2000 | Voss et al. |
| 6,190,634 B1 | 2/2001 | Lieber et al. |
| 6,268,014 B1 | 7/2001 | Eberspacher et al. |
| 6,294,261 B1 | 9/2001 | Sangeeta et al. |
| 6,320,375 B1 | 11/2001 | Cotton et al. |
| 6,328,779 B1 | 12/2001 | He et al. |
| 6,379,712 B1 | 4/2002 | Yan et al. |
| 6,416,818 B1 | 7/2002 | Aikens et al. |
| 6,426,315 B1 | 7/2002 | Bergstrom et al. |
| 6,454,492 B1 | 8/2002 | Dean et al. |
| 6,448,190 B1 | 9/2002 | Hayashi et al. |
| 6,476,312 B1 | 11/2002 | Barnham |
| 6,500,733 B1 | 12/2002 | Stanbery |
| 6,551,719 B2 | 4/2003 | Furuya et al. |
| 6,559,372 B2 | 5/2003 | Stanbery |
| 6,593,213 B2 | 7/2003 | Stanbery |
| 6,620,456 B2 | 9/2003 | Blanton et al. |
| 6,624,213 B2 | 9/2003 | George et al. |
| 6,663,983 B1 | 12/2003 | Darolia et al. |
| 6,686,489 B2 | 2/2004 | Celinska et al. |
| 6,730,757 B2 | 5/2004 | Wang et al. |
| 6,736,986 B2 | 5/2004 | Stanbery |
| 6,759,100 B2 | 7/2004 | Fukuda et al. |
| 6,769,152 B1 | 8/2004 | Crenshaw et al. |
| 6,773,513 B2 | 8/2004 | Ludtka |
| 6,872,049 B2 | 3/2005 | Christensen |
| 6,969,484 B2 | 11/2005 | Horiguchi et al. |
| 7,083,710 B2 | 8/2006 | Scheer et al. |
| 7,105,807 B2 | 9/2006 | Hansen |
| 7,117,099 B2 | 10/2006 | Strassner et al. |
| 7,161,124 B2 | 1/2007 | Kisner et al. |
| 7,163,759 B2 | 1/2007 | Milliken et al. |
| 7,177,099 B2 | 2/2007 | Mercado et al. |
| 7,211,292 B1 | 5/2007 | Budaragin |
| 7,227,172 B2 | 5/2007 | Kitaoka et al. |
| 7,227,736 B2 | 6/2007 | Shioga et al. |
| 7,235,171 B2 | 6/2007 | Taniguchi |
| 7,250,147 B2 | 7/2007 | Tour et al. |
| 7,271,333 B2 | 9/2007 | Fabick et al. |
| 7,300,684 B2 | 11/2007 | Boardman et al. |
| 7,306,823 B2 | 12/2007 | Sager et al. |
| 7,318,763 B2 | 1/2008 | Tsakalakos et al. |
| 7,351,488 B2 | 4/2008 | Visco et al. |
| 7,400,055 B2 | 7/2008 | Nagao |
| 7,491,376 B2 | 2/2009 | Barron et al. |
| 7,718,221 B2 | 5/2010 | Budaragin et al. |
| 9,353,434 B2 | 5/2016 | Deininger et al. |
| 9,625,079 B2 | 4/2017 | Budaragin et al. |
| 2002/0004028 A1 | 1/2002 | Margrave et al. |
| 2002/0006470 A1 | 1/2002 | Eberspacher et al. |
| 2002/0029514 A1 * | 3/2002 | Lindstrom ............... C10G 9/16 44/640 |
| 2002/0041928 A1 * | 4/2002 | Budaragin .......... C23C 18/1216 427/229 |
| 2003/0180466 A1 | 9/2003 | Rohrbaugh et al. |
| 2004/0061114 A1 | 4/2004 | Yan et al. |
| 2004/0188323 A1 | 9/2004 | Tzatzov et al. |
| 2004/0253438 A1 | 12/2004 | Budaragin et al. |
| 2005/0089684 A1 | 4/2005 | Barron et al. |
| 2005/0247339 A1 | 11/2005 | Barnham et al. |
| 2005/0257744 A1 | 11/2005 | Boardman et al. |
| 2006/0097615 A1 | 5/2006 | Tsakalakos et al. |
| 2006/0196419 A1 | 9/2006 | Tudhope et al. |
| 2006/0198965 A1 | 9/2006 | Tudhope et al. |
| 2006/0229197 A1 | 10/2006 | Stark et al. |
| 2006/0275551 A1 * | 12/2006 | Hise ....................... C10G 35/04 427/383.1 |
| 2007/0015002 A1 | 1/2007 | Narula et al. |
| 2007/0077440 A1 | 4/2007 | Gawalt |
| 2007/0237998 A1 | 10/2007 | Armstrong et al. |
| 2007/0262059 A1 | 11/2007 | Boardman et al. |
| 2008/0029494 A1 | 2/2008 | Tudhope et al. |
| 2008/0063587 A1 | 3/2008 | Strano et al. |
| 2008/0118777 A1 | 5/2008 | Li et al. |
| 2008/0233040 A1 | 9/2008 | Barron et al. |

FOREIGN PATENT DOCUMENTS

| | | | |
|---|---|---|---|
| EP | 1088908 A2 * | 4/2001 | ............... C23C 4/18 |
| FR | 2617507 | 1/1989 | |
| SU | 923232 | 4/1994 | |
| WO | 1997025146 | 7/1997 | |
| WO | 97/41275 A1 | 11/1997 | |
| WO | 2004103900 | 12/2004 | |

(56) References Cited

FOREIGN PATENT DOCUMENTS

| WO | 2004104261 | 12/2004 |
| --- | --- | --- |
| WO | 2005010126 | 2/2005 |
| WO | 2005019324 | 3/2005 |
| WO | 2007009104 | 1/2007 |
| WO | 2008130433 | 10/2008 |

OTHER PUBLICATIONS

Hofmann et al., "Gold Catalyzed Growth of Silicon Nanowires by Plasma Enhanced Chemical Vapor Deposition," 94 J. Appl. Phys. (2003) 6005-12.

I. Kosacki et al., "Raman Scattering and Lattice Defects in Nanocrystalline CeO2 Thin Films," 149 Solid State Ionics 99-105 (2002).

Muhammad et al., "Vapor-Liquid Solid Mechanisms Using Gold Colloids for the Growth of GaAs Nanowires," 4 J. Fund. Sciences (2008) 363-67.

Chen et al., "Photocatalytic Degradation of Methylene Blue by CNT/TiO2 Composites Prepared from MWCNT and Titanium n-Butoxide with Benzene," 45 J. Korean Ceram. Soc. (2008) 651-57.

Civale et al., "Aspects of Silicon Nanowire Synthesis by Aluminum-Catalyzed Vapor-Liquid-Solid Mechanism," Proceedings of 7th Annual Workshop on Semiconductor Advances for Future Electronics (SAFE 2004), Nov. 25-26, 2004, Veldhoven, The Netherlands,Publ. STW, ISBN 90-73461-43-X, pp. 692-696.

Garicia-Barriocanal et al., Colossal Ionic Conductivity at Interfaces of Epitaxial ZrO2:Y2O3/SrTiO3 Heterostructures, 321 Science 676 (2008).

"High Emissivity Coating Technology Improves Heater Performance" (available at http://www.cisoilgas.com/pastissue/printarticle.asp?art=26188)(accessed Jun. 3, 2008).

"Curtailing Coke Formation in Ethylene Furnace Tubes" Nexant, Inc., Jun. 4, 2003 (available at http://nexant.ecnext.com/coms2/gi_0255-146/Curtaining-Coke-Formation-in-Ethylene.html (accessed Sep. 27, 2007) (4 pages).

G.C. Hood et al., "Aluminum Acetates and Propionates—Their Preparation and Composition," 72 J. Am. Chem. Soc., 2094-95 (1950).

Hu et al., "TiO2 Thin Films Prepared from Aqueous Solution and Their Sterilizing Capability," 7 J. Ceram. Proc. Res., (2006) 49-52.

Kanai et al., "Semiconductor Testing Probe Utilizing Silicon Whisker Grown by VLS (Vapor Liquid Solid) Method," Tokyo Cathode Laboratory (Jun. 6, 2001) (available at: http://www.swtest.org/swtw_library/2001proc/PDF/S7_01.pdf (accessed Feb. 20, 2009).

Narayanan et al., "Synthesis of Soluble Aluminium Carboxylates Directly from Aluminium Hydroxide," J. Mater. Chem., 10 (2000) 2097-104.

Zhu et al., "Preparation and Characterization of New Photocatalyst Combined MWCNTs with TiO2 Nanotubes," 17 Trans. Nonferrous Met. Soc. China (2007) s1117-s1121.

"Zirconia Toughened Alumina ZTA—Properties and Applications of ZTA by Dynamic Ceramic Ltd." (available at http://www.azom.com/details.asp?ArticleID=3303)(accessed Dec. 7, 2007).

K. An, "Mechanical Properties and Electrochemical Durability of Solid Oxide Fuel Cells," Ph.D. Dissertation, Viginia Polytechnic Institute and State University (2003).

A. Krishnan, "Solid Oxide Membrane Process for the Direct Reduction of Magnesium from Magnesium Oxide," Ph. D. Dissertation, Boston University (2006).

J. Britt, Photovoltaic Manufacturing Cost and Throughput Improvements for Thin Film CIGS-Based Molecules: Final Technical Report, Apr. 2002, National Renewable Energy Laboratories.

Hernadi et al., "Synthesis of MWNT-based Composite Materials with Inorganic Coating," 51 Acta Materialia (2003) pp. 1447-1452.

Zervos et al., "Printed and Thin Film Photovoltaics and Batteries," (IDTechEx, Jun., 2008) (available at http://www.idtechex.com/research/reports/printed_and_thin_film_photovoltaics_and_batteries_000172.asp) (accessed Mar. 5, 2009).

M. Brown, "Taking the Heat," Frontiers (Apr. 2004) pp. 34-37.

Latu-Romain et al., "Growth Parameters and Shape Specific Synthesis of Silicon Nanowires by the VLS Method," 10 J. Nanopart Res. (2008) 1287-91.

Larcher et al., "Some Insights on the Use of Polyols-Based Metal Alkoxide Powders as Precursors for Tailored Metal-Oxides Particles," Chem. Mater. 2003, 15, 3543-3551.

Kirkham et al., "X-Ray Analysis of VLS-Grown, Verically-Aligned ZnO Nanorods," Abstract, available at http://www.dxcicdd.com/07/PDF/Melanie_Kirkham.pdf (accessed Feb. 20, 2009); apparently presented Jul. 30, 2007 at 2007 Denver X-ray Conference (see http://www.dxcicdd.com/07/ (accessed Feb. 20, 2009)).

Natesan et al., "Development of Materials Resistant to Metal Dusting Degradation," (Argonne National Lab., Mar. 2006).

Written Opinion of International Searching Authority, PCT/US07/81230, dated Oct. 28, 2008 (6 pages).

Office Action in Canadian Application No. 2,665,881, dated May 9, 2013 (3 pages).

C. D. Chandler et al., "Chemical Aspects of Solution Routes to Perovskite-Phase Mixed-Metal Oxides from Metal-Organic Precursors," Chem. Rev., vol. 93, pp. 1205-1241 (1993).

J. Gopal et al., "Investigations of the Antibacterial Properties of an Anodized Titanium Alloy," Trends Biomater. Artif. Organs., vol. 17 (1), pp. 13-18 (2003).

Office Action in Canadian Application No. 2,665,881, dated Mar. 4, 2014 (4 pages).

Office Action in Canadian Application No. 2,665,881, dated May 7, 2015 (5 pages).

* cited by examiner

METHODS FOR PROVIDING PROPHYLACTIC SURFACE TREATMENT FOR FLUID PROCESSING SYSTEMS AND COMPONENTS THEREOF

RELATED APPLICATIONS

This application is a continuation of and claims benefit of priority under 35 U.S.C. § 120 of co-pending and allowed U.S. Non-Provisional patent application Ser. No. 15/138,741, entitled, "METHODS FOR PROVIDING PROPHYLACTIC SURFACE TREATMENT FOR FLUID PROCESSING SYSTEMS AND COMPONENTS THEREOF," filed on Apr. 26, 2016, which is a continuation of and claims benefit of priority under 35 U.S.C. § 120 of U.S. Non-Provisional patent application Ser. No. 12/444,519, now U.S. Pat. No. 9,353,434 B2 entitled, "METHODS FOR PROVIDING PROPHYLACTIC SURFACE TREATMENT FOR FLUID PROCESSING SYSTEMS AND COMPONENTS THEREOF," which entered the U.S. National Phase on Jan. 7, 2010 under 35 U.S.C. § 371 for International Patent Application No. PCT/US2007/081230, entitled, "METHODS FOR PROVIDING PROPHYLACTIC SURFACE TREATMENT FOR FLUID PROCESSING SYSTEMS AND COMPONENTS THEREOF," filed internationally on Oct. 12, 2007, which claims benefit of priority under PCT Chapter I, Article 8, and 35 U.S.C. § 119(e) of U.S. Provisional Application No. 60/851,354, entitled "METHOD FOR PROVING PROPHYLACTIC SURFACE TREATMENT FOR FLUID PROCESSING SYSTEMS AND COMPONENTS THEREOF," filed on Oct. 12, 2006. U.S. application Ser. Nos. 15/138,741, 12/444,519, PCT Application No. PCT/US2007/081230, and U.S. Provisional Application No. 60/851,354 are each incorporated herein by reference in their entirety.

TECHNICAL FIELD

The invention relates to methods for creating a metal oxide surface treatment on one or more surfaces of fluid transport or processing systems providing improved surface prophylaxis against fouling. The methods can be performed in situ on existing fluid processing or transport systems, which minimizes the disruption to the surface treatment created by welds, joints, flanges, and damage caused by or during the system assembly process. The invention also relates to articles having one or more surfaces comprising at least one metal oxide.

BACKGROUND ART

Metals, ceramics, glasses, and cermets are used to construct many functional items that are in turn used in carrying out industrial processes. Under certain operating conditions of these processes, surface degradation of a component can result from many causes. These can include the corrosive nature of particular process conditions, thermal effects of the process or environment, contamination from various elements becoming deposited on the surface or infiltrating into the material, deposits formed by catalytic activity between the component's material and the process fluid, galvanic activity between the component's material and the process fluid, concentration cell corrosion, crevice corrosion, graphitic corrosion, and a combination of these degradation mechanisms with each other or with other mechanisms.

During operation, various industrial process systems suffer degradation to the working sections of the system being attacked by various chemicals and conditions. This occurs in the oil industry, colorants industry, cosmetics industry, food industry, pharmaceutical industry, chemical industry, and within closed systems such as cooling systems, heating and air conditioning systems, and many others. Additional systems that are affected by surface degradation are furnaces, boilers, internal combustion engines, gas turbine engine systems, rockets, etc. In any continuous or intermittent process system there is the risk of surface degradation due to the exposure of materials to certain chemicals and conditions. The surfaces exposed to the process may degrade due to the material itself degrading, eroding, or corroding, or the degradation may be in the form of deposits that accumulate on the material, affecting performance of one sort of another, e.g. flow efficiency through a pipe. Any kind of degradation is generally referred to as "fouling." The typical solution to these types of fouling is to upgrade the material used to construct the functional item, be it a pipe, a heat exchanger, etc. For example, a pipe may be constructed of a nickel alloy stainless steel, rather than of common carbon steel, in an attempt to improve its inner and outer surface longevity and/or functionality. As another example, tanks used to hold various chemical materials may experience material deposits or reactions on the inner surface of the tank, which can adversely affect the overall process efficiency. Coating or lining the interior of the tank with glass may help to reduce these reactions because of the comparatively unreactive nature of the glass. In another example, a heat exchanger may be made from a high nickel content alloy to allow it to withstand high temperature operation (as in the case of a hydrocarbon-fuel gas turbine system) while also reducing the amount of precipitates and deposits that might be occurring due to the caustic environment in which the heat exchanger is required to operate. In yet another example, an exhaust valve for use in an internal combustion engine may be made from a particular alloy in an effort to reduce the amount of carbon deposits forming on its surface; carbon deposits are a well known source of operational and emission problems for internal combustion engines.

Many industrial processes use materials to contain and transport various fluids, slurries, or vapors, and those materials can become degraded during use. These problems are known as "flow assurance" issues, which is the industry term for the growth of flow restrictions in various pipes, tubes, heat exchangers, and process containers, etc. For instance, the interior of a pipeline used in an industrial process may have its effective cross-sectional area reduced during operation by deposits from the chemicals carried within the pipe during various processes. In other cases, the vaporous or liquid elements carried within a heat exchanger may precipitate the growth of crystalline deposits if favorable conditions (temperature, pressure, presence of catalytic elements, etc.) exist within the system. In one example of this problem, crystals of various elements may grow during fluid processing operation because certain exposed molecules within the material surface of the interior of a conduit serve to catalyze the growth of some types of fibers on the interior wall of the conduit. For example, carbon fibers grow on the interior of metal pipes used for ethylene transport, petrochemical cracking tubes, petroleum refinery heaters, natural gas turbine blades, propane and LPG transport tanks, etc. While the mechanism of carbon fiber formation is not entirely clear, it is believed that exposed iron or other atoms at the surface of a steel or iron pipe in, e.g., a petroleum processing facility, may play a role in decomposing hydrocarbons flowing in the pipe into carbon. Because carbon has some solubility in iron, a steel or iron pipe may absorb this carbon. When the pipe material becomes saturated with carbon, amorphous carbon fibers begin to grow rapidly at process temperatures in the range of about 400° C. to about 800° C. Such deposits and/or fibrous growths affect the boundary layer development of the fluids and/or vapors passing through the pipe's interior, and can cause a significant restriction in the pipe's ability to transfer fluids, vapors, or slurries. Furthermore, a corrosive environment, especially due to the presence of water and impurities or salts dissolved in it, cause corrosion of metal pipes leading to eventual failure. Also, it is known that petrochemical process fluids flowing through a metal tube at high temperature can cause metal wastage in what is known as metal dusting, wherein the tube's inner surface is eroded by various mechanisms. Accordingly, there is a need in the art for a way to prevent or significantly inhibit the growth of carbon fibers while at the same time inhibiting chemical attack of corrosive elements on the substrate, such as those that result in metal dusting of components within a system.

All throughout industry, passageways and chambers regularly experience deposits on their interior surfaces caused by precipitates of the production fluids, deposits exacerbated by high temperatures, solidification of matter in slow moving boundary layers, and deposits occurring by various other mechanisms. Some components, such as heat exchangers, can experience deposits from the processed fluid and from the heat exchange medium, thereby experiencing fouling on multiple interior surfaces. In some cases, more than one interior surface contacts hydrocarbons being processed, such as in a heat exchanger that transfers heat from processed material to feed material. Other components, such as pipelines, can suffer corrosion on outer surfaces due to process and/or environmental factors. The repairing of such problems has large costs associated with it due to interruption of production while sections of a process system are identified and then cleaned, bypassed, and/or replaced. The petroleum industry, for example, has literally thousands of miles of connective pipelines, tubes, manifolds, as well as thousands of heat exchangers and process risers, etc. that require regular maintenance and repair at great costs to the industry. For example, shutting down a petroleum refinery to repair and/or replace flow restricted pipes results in losses of approximately $200,000 to $500,000 per day of lost output.

In another example, at high process pressures and at temperatures above 0° C., methane gas, present in the petrochemical stream may react with water to form ice-like structures called hydrates. Hydrate formation in production-stream flow lines in the petroleum industry is also of great concern. Production-stream flow lines carry the raw, produced fluids from the wellhead to a processing facility. If a flow line is operated in the "hydrate region" (i.e., under conditions at which hydrates can form in an oil or gas wellstream), hydrates can deposit on the pipe's inner wall and agglomerate until they completely block the flow line and stop the transport of hydrocarbons to the processing facility. Attempts to prevent hydrate formation typically involve injecting additives into the process fluid, but this can be a costly solution.

Because the problem of deposits on the interior of process pipes and tubes and the resulting reduction in flow is so large, there are a number of industry associations participating in the study and improvement of flow assurance in fluid processing systems. For example, the Gas Technology Institute estimates that the cost of hydrate formation remediation to industry is over $100 million per year.

Deposits on the interior surface of a pipe have significant negative impact on the pipe's ability to transfer fluids or gases, and these results can vary depending on the surface roughness of the deposit. For example, a smooth deposit of 5% on the interior of a pipe of circular cross-section can cause a loss of throughput of 10%, and require a pressure increase of 30% to maintain constant flow. An uneven deposit of 5% can increase the loss of throughput to 35% and require a pressure increase of 140% to maintain constant flow. See Cordell, Introduction to Pipeline Pigging, $5^{th}$ Edition (ISBN0-901360-33-3).

Deposit growth on the inside of a pipe can cause deposits or growths to become so large as to nearly stop all fluid flow through the pipe, as shown in FIG. 1. Conditions such as these can occur within a few months, or even within a few weeks of operation in the case of certain industrial processes.

In other applications, scale is caused by precipitates formed within a process system's enclosures during oil and gas recovery, food processing, water treatment, or other industrial processes. The most common scales are inorganic salts such as barium sulphate, strontium sulphate, and calcium carbonate. In some cases the scales may be partly organic (naphthanates, MEG-based etc.). Other scale formations may be composed of sodium chloride, iron carbonate, and magnesium hydroxide. Scales formed from sulphates generally are due to mixing of chemically incompatible waters (like sea water and formation water). Carbonate scales result from pressure release of waters containing bicarbonate at high concentration levels. Scaling degrades the process efficiency by plugging sand screens and production pipe, by causing failures in valves, pumps, heat exchangers, and separators. Scaling may also block transportation pipelines.

Furthermore, combustion buildup known as slag or scale often forms on the flame-heated surfaces of furnaces, boilers, heater tubes, preheaters, and reheaters. The degree of combustion buildup depends on the quality of the fuel being burned. Clean natural gas, for example, produces little or no combustion buildup, while coal, a "dirtier" fuel, produces significant combustion buildup. In particular, coal-fired power plants experience significant combustion buildup on boiler vessels in contact with the coal combustion products. That buildup decreases heat transfer through the surface to the substance being heated, and therefore wastes energy. Also, such combustion buildup increases the applied temperature necessary to cause the substance to achieve a desired temperature. That increased temperature stresses the boiler vessel, and may lead to material failure. Preventing combustion buildup on the flame-heated surfaces of a fluid transport or processing system would reduce energy consumption and extend equipment lifetime.

In some applications, the surfaces exposed to fluid flow may become degraded by the nature of the fluid itself, for example, in the case of hydrogen transport and containment, which has the associated problem of hydrogen embrittlement of the exposed materials.

Throughout industry and technology, sensors detect operational parameters of various processes. By necessity, those sensors inhabit the process material, and are subject to those fouling mechanisms inherent in the processes they monitor. Unfortunately, even the smallest degree of fouling may affect the accuracy of a sensor, even if that same degree of fouling has only a negligible effect on the process itself. Often the remedy to sensor fouling is to design the sensor and sensor mounting apparatus to easily replace fouled sensors. Sensors represent high value components, and frequent sensor replacement adds significant costs in addition to production loss due to shut down for sensor replacement.

The hydrocarbon process industry recognizes several distinct mechanisms for the fouling of process components due to the unique conditions of those processes. One mechanism, known as coking, results from heating hydrocarbons and driving off lighter, lower-boiling fractions causing thermal condensation of heavier fractions. Asphaltenes, tars, inorganic material, and other solids will form on the surfaces of various petrochemical process units. In particular, vacuum columns, fluid catalytic crackers, cokers, viscosity breakers, and any equipment handling heavier oil fractions at high temperatures suffer from the buildup of coke. Also, the high-temperature environment of an ethylene cracker causes polymerization of carbon-carbon double bonds, the product of which condenses and forms coke upon further heating. When high temperature plays a significant role and forms high molecular weight coke, the resulting material is called pyrolytic coke. In a different process, a metal species such as iron or nickel catalyses the dehydrogenation of a hydrocarbon, leading to what is known as catalytic coking. Elemental carbon then deposits in the metal, weakening it. When the system is shut down and cooled for decoking or other maintenance, the weakened metal can crack or spall. In some cases, the carburized metal can spall at process temperatures, resulting in metal dusting mentioned above.

In addition to reducing process throughput, coke buildup decreases heat transfer, requiring higher process temperatures consuming more energy and lowering equipment lifetime. Coke deposits can cause uneven heating, forcing the use of lower temperatures to avoid safety issues. In addition, shutting down those systems to decoke stops production. System shut downs and restarts cause thermal stress and increase the likelihood of system malfunctions and material failure. Reducing coke buildup can extend equipment lifetime, improve process throughput, lower energy consumption and operating temperatures, increase safety, and makes less-expensive alloys available for equipment construction. Moreover, increasing the actual temperature of the process stream (not just the temperature of the outside of the heated vessels) would increase process efficiency and throughput. As it is, many process temperatures are limited by the metallurgy of the heater tubes. Coke buildup requires higher temperatures to be applied outside to obtain a given temperature inside those tubes.

A second distinct mechanism for fouling equipment in the hydrocarbon industry is corrosion by one or more chemicals present in the process stream. In particular, hydrogen sulfide ($H_2S$) attacks metal surfaces, causing the formation of iron sulfates that flake from hydrocarbon-contacting surfaces, reducing the thickness and strength of process equipment, clogging passages, and potentially diminishing the activity of catalysts downstream. The presence of ammonia ($NH_3$), ammonium chloride ($NH_4Cl$), or hydrogen (H and $H_2$) enhances corrosive attack by $H_2S$. Furthermore, acids such as hydrochloric acid (HCl), naphthenic acid, sulfuric acid ($H_2SO_4$), and hydrofluoric acid (HF) cause corrosive attack at various points in hydrocarbon processing systems. For example, naphthenic acid corrosion can be observed in process equipment handling diesel and heavier fractions, because naphthenic acids tend to have boiling points similar to diesel fractions. Corrosion by sulfuric acid and hydrofluoric acids occurs in alkylating units and associated components employing those acids. Protection against corrosive mechanisms may be found in using chromium, nickel, and molybdenum alloys, and by adding substances to the process stream such as base to neutralize acid. Ironically, $H_2S$ is added to process streams to reduce metal dusting and other forms of fouling; yet $H_2S$ itself causes corrosion. That compound also arises during hydrodesulfuring processes, when thiols and other naturally-present organosulfur compounds react to form $H_2S$ and desulfured hydrocarbons. In addition, metal systems handling alternative fuels such as alcohols including methanol and ethanol have been shown to experience corrosion. Protecting equipment against those corrosive mechanisms can lower operating costs, increase run length, extend equipment life, and make less-expensive materials available for equipment construction.

As petroleum resources become less plentiful and more expensive, renewable sources of hydrocarbons increase in importance. Biodiesel, for example, promises an alternative fuel to petrodiesel, the fuel derived from crude oil. However, biodiesel refining presents unique challenges to refining equipment. Typically, a strong base such as sodium hydroxide or potassium hydroxide in alcohol digests triglycerides and long-chain fatty acids from a biological or renewable source, to form esterified fatty acids (biodiesel) and glycerin. That source may be corn, soy, oil palm, pulp, bark, even restaurant waste and garbage. The harsh basic environment required for the digestion reaction may cause caustic stress corrosion cracking, also known as caustic embrittlement. Heat treatments and nickel-based alloys may be necessary to avoid cracking, unless a less-expensive or more-effective means can be found to protect that equipment.

Surfaces that become contaminated with debris during process operation often adversely affect the efficiency and/or functionality of the process itself. Currently, most cleaning methods to remove deposits on interior surfaces within systems of the types described above in process plants involve using one or more of the following strategies:

Chemical solvents such as kerosene or diesel fuel, or stronger aromatic solvents such as xylene or toluene.
Dispersants that act as surfactants
Exothermic chemical reactions
Mechanical cleaning methods such as pigging or jetting
Thermal cleaning methods that involve hot oil or diesel fuel, or the external application of high heat to break down surface deposits These methods involve considerable time and effort on the part of process plant maintenance personnel, reducing output or throughput of a system and causing the associated loss of revenue to the plant.

Similarly, in powder metal spraying operations, chemical attack occurs within the spraying chamber that rapidly degrades its interior surfaces. In other applications such as food processing, beverage production, and similar closed process systems, material degradation on the interior surface of many portions of a process system occurs due to chemical attack, material deposits, fibrous growth, and other surface contaminants.

Portions of fluid processing and transport systems exposed to the environment, especially those containing iron, also experience corrosion from environmental factors. Chemical, thermal, and galvanic attack represent leading mechanisms of exterior surface fouling in those systems.

There exists, therefore, the need for an improved means of protecting the surfaces in many functional components from a variety of contaminants that build up or chemical erosion that occurs, through various mechanisms, during the component's normal operation. An improved surface treatment that can be affordably applied and that provides a demonstrable resistance to surface contamination would serve to improve many processes currently in use throughout industry. The invention disclosed herein addresses this need.

SUMMARY OF THE INVENTION

Various embodiments of the present invention are described herein. These embodiments are merely illustrations of the present invention. Numerous modifications and adaptations thereof will be readily apparent to those skilled in the art without departing from the spirit and scope of the invention.

The invention described herein provides a method for protecting surfaces of fluid transport or process equipment. As used herein, the term "fluid processing or transport system, or a component thereof" means any equipment within which fluid (used herein to include any material that is wholly or partially in a gaseous or liquid state, and includes, without limitation, liquids, gases, two-phase systems, semi-solid system, slurries, etc.) flows or is stored, such as pipes, tubes, conduits, heat exchangers, beds, tanks, reactors, nozzles, cyclones, silencers, combustion chambers, intake manifolds, exhaust manifolds, ports, etc., as well as any equipment within which a chemical or physical change occurs, wherein at least one of the components participating in the chemical or physical change is a fluid. The method of the invention protects the surfaces of such equipment by decreasing or preventing degradation, whether through deposition of material on the surfaces, through infiltration of material into the surfaces, or through corrosive attack on the material surface. The method is adapted to be used, in some embodiments, on fluid process equipment, or portions thereof, after assembly, resulting in significantly decreased interruption or interference with the protective functions of the coating by welds, joints, or other structures within the equipment that are created when the equipment is built or assembled.

The present invention relates, in some aspects, to forming at least one metal oxide on an interior or exterior surface of fluid transport or process equipment. The at least one metal oxide can be formed on the surface by (1) placing at least one metal compound on the surface and (2) converting at least some of the at least one metal compound into at least one metal oxide. Metal compounds useful in the present invention contain at least one metal atom and at least one oxygen atom. Non-limiting examples of useful metal compounds include metal carboxylates, metal alkoxides, and metal β-diketonates. Converting the metal compound can be accomplished by a wide variety of methods, such as, for example, heating the environment around the metal compound, heating the substrate under the metal compound, heating the metal compound itself, or a combination of those three. In other embodiments, converting the metal compound can be accomplished by catalysis.

Some embodiments of the present invention provide a method for forming at least one metal oxide on a surface of a fluid processing or transport system, or a component thereof, comprising: at least partially assembling the system; applying at least one metal compound to the surface; and exposing the surface with the applied at least one metal compound to an environment that will convert at least some of the compound to at least one metal oxide. In other embodiments, the fluid processing or transport system is substantially assembled prior to forming at least one metal oxide coating on at least one surface of the system. In still other embodiments, the fluid processing or transport system is fully assembled prior to forming at least one metal oxide coating on at least one surface of the system.

In some embodiments, the invention relates to a method for forming at least one metal oxide on a surface of a fluid processing or transport system, or a component thereof, comprising: applying a metal compound composition to the surface, wherein the metal compound composition comprises at least one metal salt of at least one carboxylic acid; and exposing the surface with the applied metal compound composition to an environment that will convert at least some of the salt to at least one metal oxide.

In some embodiments, the invention relates to a method for forming at least one metal oxide on a surface of a fluid processing or transport system, or a component thereof, comprising: applying a metal compound composition to the surface, wherein the metal compound composition comprises at least one metal alkoxide; and exposing the surface with the applied metal compound composition to an environment that will convert at least some of the metal alkoxide to at least one metal oxide.

In some embodiments, the invention relates to a method for forming at least one metal oxide on a surface of a fluid processing or transport system, or a component thereof, comprising: applying a metal compound composition to the surface, wherein the metal compound composition comprises at least one metal β-diketonate; and exposing the surface with the applied metal compound composition to an environment that will convert at least some of the metal β-diketonate to at least one metal oxide.

In further embodiments, the invention relates to a method for forming at least one metal oxide on a surface of a fluid processing or transport system, or a component thereof, comprising: applying a metal compound composition to the surface, wherein the metal compound composition comprises at least one rare earth metal compound, and at least one transition metal compound; and exposing the surface with the applied metal compound composition to an environment that will convert at least some of the compounds to at least one metal oxide.

The invention, in additional embodiments, relates to a method for forming at least one metal oxide on a surface of a fluid processing or transport system, or a component thereof, comprising:

applying a liquid metal compound composition to the surface, wherein the liquid metal compound composition comprises a solution of at least one rare earth metal compound and at least one transition metal compound, in a solvent, and exposing the surface with the applied liquid compound to a heated environment that will convert at least some of the metal compound to at least one metal oxide, thereby forming a metal oxide coating on the surface.

In some embodiments, the metal oxide coating may be crystalline, nanocrystalline, amorphous, thin film, or diffuse, or a combination of any of the foregoing. For example, a metal oxide coating in some embodiments of the present invention may comprise a thin film that contains both nanocrystalline and amorphous regions.

In other embodiments, the invention relates to a method for forming an oxidizing coating on an interior surface of a fluid processing or transport system, comprising:

applying a liquid metal carboxylate composition to the surface, wherein the liquid metal carboxylate composition comprises a solution of at least one rare earth metal salt of a carboxylic acid and at least one transition metal salt of a carboxylic acid, in a solvent, and exposing the surface with the applied liquid metal carboxylate composition to a heated environment that will convert at least some of the metal carboxylate to metal oxides, thereby forming a thin layer of a nanocrystalline coating on the surface.

In some embodiments, the invention relates to a method for forming an oxidizing coating on an interior surface of a fluid processing or transport system, comprising:

applying a liquid metal carboxylate composition to the surface, wherein the liquid metal carboxylate composition comprises a solution of zirconium carboxylate and at least one transition metal salt of a carboxylic acid, in a solvent, and exposing the surface with the applied liquid metal carboxylate composition to a heated environment that will convert at least some of the metal carboxylate to metal oxides, thereby forming a thin layer of a nanocrystalline coating on the surface.

In additional embodiments, the method of the invention further includes a step of applying a solution of organosiloxane-silica in ethanol over the formed oxide coating and exposing the coated substrate to an environment that will remove volatile components from the solution without decomposing organo-silicon bonds. In some embodiments, this step can be repeated once or more.

The various coatings of the present invention are formed, in some embodiments, by a method of forming an oxidizing coating on a substrate comprising:
(a) applying a liquid metal compound composition to the substrate, wherein the liquid metal compound composition comprises a solution of at least one rare earth metal compound and at least one transition metal compound, in a solvent, and
(b) exposing the substrate with the applied liquid metal compound composition to an environment that will convert at least some of the metal compound to metal oxides, thereby forming an oxidizing coating on the substrate.

In other embodiments, the invention relates to metal oxide coatings (and articles coated therewith) containing two or more rare earth metal oxides and at least one transition metal oxide. Further embodiments of the invention relate to metal oxide coatings (and articles coated therewith), containing ceria, a second rare earth metal oxide, and a transition metal oxide. Some embodiments relate to metal oxide coatings (and articles coated therewith), containing yttria, zirconia, and a second rare earth metal oxide. In some cases, the second rare earth metal oxide can include platinum or other known catalytic elements.

In the case of catalytic surfaces, this method allows for cost savings by reducing the bulk amount of the catalyst. And, it also allows a wider variety of catalysts to be applied either as mixtures or in disparate layers to achieve tightly targeted results.

Therefore, some embodiments of the invention create a protective metal oxide coating on a chosen surface to serve as a prophylaxis against attack from chemical, thermal, ionic, or electronic degradation. The metal oxide coatings of some embodiments prevent the growth of fibers, formation of hydrate crystals, and act as a prophylaxis generally against growth of any materials that block, interfere, or contaminate the successful operation of an enclosed system.

Accordingly, some embodiments of the present invention provide a method for decreasing or preventing fouling of a surface of a fluid processing or transport system, or a component thereof, comprising applying at least one metal compound to the surface, and exposing the surface with the applied at least one metal compound to an environment that will convert at least some of the compound to at least one metal oxide, wherein the at least one metal oxide is resistant to fouling.

Other embodiments of the present invention provide a method for decreasing or preventing fouling of a surface of a sensor, or a component thereof, comprising applying at least one metal compound to the surface, and exposing the surface with the applied at least one metal compound to an environment that will convert at least some of the compound to at least one metal oxide, wherein the at least one metal oxide is resistant to fouling.

Some embodiments of the present invention provide a method for reducing or preventing coke buildup on a surface of a fluid processing or transport system, or a component thereof, comprising applying at least one metal compound to the surface, and exposing the surface with the applied at least one metal compound to an environment that will convert at least some of the compound to at least one metal oxide, wherein the at least one metal oxide is resistant to coke buildup.

Other embodiments of the present invention provide a method for reducing or preventing corrosive attack on a surface of a fluid processing or transport system, or a component thereof, comprising applying at least one metal compound to the surface, and exposing the surface with the applied at least one metal compound to an environment that will convert at least some of the compound to at least one metal oxide, wherein the at least one metal oxide is resistant to corrosive attack.

Still other embodiments provide methods for reducing or preventing combustion buildup on a flame-heated surface of a fluid processing or transport system, or a component thereof, comprising: applying at least one metal compound to the surface, and exposing the surface with the applied at least one metal compound to an environment that will convert at least some of the compound to at least one metal oxide, wherein the at least one metal oxide is resistant to combustion buildup.

Further embodiments provide methods for reducing or preventing fouling of at least one metal surface of a combustion engine system or a component thereof, comprising applying at least one metal compound to the surface, and exposing the surface with the applied at least one metal compound to an environment that will convert at least some of the compound to at least one metal oxide, wherein the at least one metal oxide is resistant to fouling.

Some embodiments of the invention provide an improved corrosion-resistant surface treatment through the creation of a nanocrystalline grain structure of zirconia- or cerium-based materials, or surface treatments of other elemental compositions with nanocrystalline microstructures that serve to isolate the substrate from chemical, thermal, or galvanic attack.

Additional embodiments provide a low cost means to form a useful coating of zirconia- or ceria-based ceramic material on a substrate, the coating having a nanocrystalline microstructure.

Some embodiments of the technology will prevent electrochemical corrosion by inhibiting the flow of electrons or ions into or from the substrate surface and from or into the process fluid stream.

Additional embodiments of the invention produce a dense metal oxide coating that does not suffer from cracking due to thermal stresses.

Some embodiments produce a metal oxide coating that does not suffer from cracking due to its fabrication method.

In further embodiments, the at least one metal oxide coating appears uniform and without cracks or holes from about 100× to about 1000× magnification.

Some embodiments provide a metal oxide coating comprising only one metal oxide. Other embodiments provide a metal oxide coating comprising only two metal oxides. Still other embodiments provide a metal oxide coating comprising only three metal oxides. In yet other embodiments, the metal oxide coating comprises four or more metal oxides.

The present invention, in some cases, also provides a low cost method for the creation of a metal oxide coating that serves to protect a surface from chemical, thermal, and/or galvanic attack. The present invention also provides a means to diffuse chosen surfaces with selected chemical ingredients using a process that does not require damaging high temperature cycles, in several embodiments.

Yet other embodiments of this invention provide corrosion resistant coatings of organosiloxane-silica over metal oxide coating to impart prolonged usefulness to substrates, when such substrates have the tendency to corrode in aqueous environments with or without salts and other impurities dissolved in water.

Additional embodiments of the invention provide a means to form a metal oxide coating on the interior of a closed system after it is assembled, giving a prophylactic coating on all surfaces exposed to chosen process including welded areas, flanged joints, etc. Further embodiments provide a fluid processing or transport system comprising at least one surface comprising at least one metal oxide coating, in which the system has a large size.

Some embodiments of the invention may be implemented such that the metal oxide coatings are formed on components of a process system prior to its assembly, for example, to a pipe or heat exchanger at its place of original manufacture. In this manner, bulk coatings of metal oxides may be formed in a more automated fashion in those embodiments, thereby providing coverage over the majority of the interior of a system while still providing a reduced but chosen level of protection against surface degradation, i.e. leaving the in-field welded areas uncoated, which may be suitable for some applications. In other embodiments, only certain surfaces within a system may be coated for desired performance, whether it be for surface protection against degradation, catalytic activity, or a combination thereof.

Accordingly, further embodiments of the present invention provide articles of manufacture adaptable to provide a surface of a fluid processing or transport system, or a component thereof, wherein the surface comprises at least one metal oxide. In some of those embodiments, at least some of the at least one metal oxide is present in a diffused coating.

Further aspects, features and advantages of the present invention will become apparent from the drawings and detailed description of the preferred embodiments that follow.

BRIEF DESCRIPTION OF DRAWINGS

The patent or application file contains at least one drawing executed in color. Copies of this patent or patent application publication with color drawings will be provided by the Office upon request and payment of the necessary fee.

MODES FOR CARRYING OUT THE INVENTION

Figure 1:
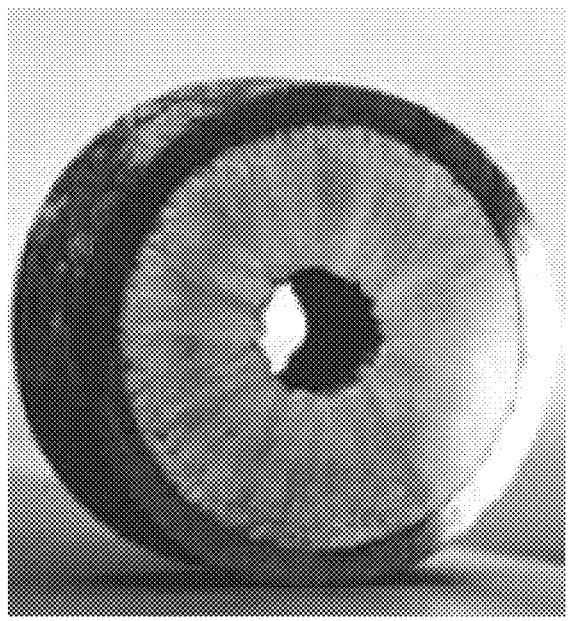
FIG. 1 shows a photograph of a cross section of an untreated pipe revealing crystalline growth that restricts flow through the pipe.
Figure 2:
FIG. 2 shows a photograph of an uncoated steel coupon after a one hour exposure to Aqua Regia.
Figure 3:
FIG. 3 shows a photograph of a steel coupon coated with "Zircon" after one hour exposed to Aqua Regia.
Figure 4:
FIG. 4 shows a photograph of a steel coupon coated with "Glass" after one hour exposed to Aqua Regia.
Figure 5:
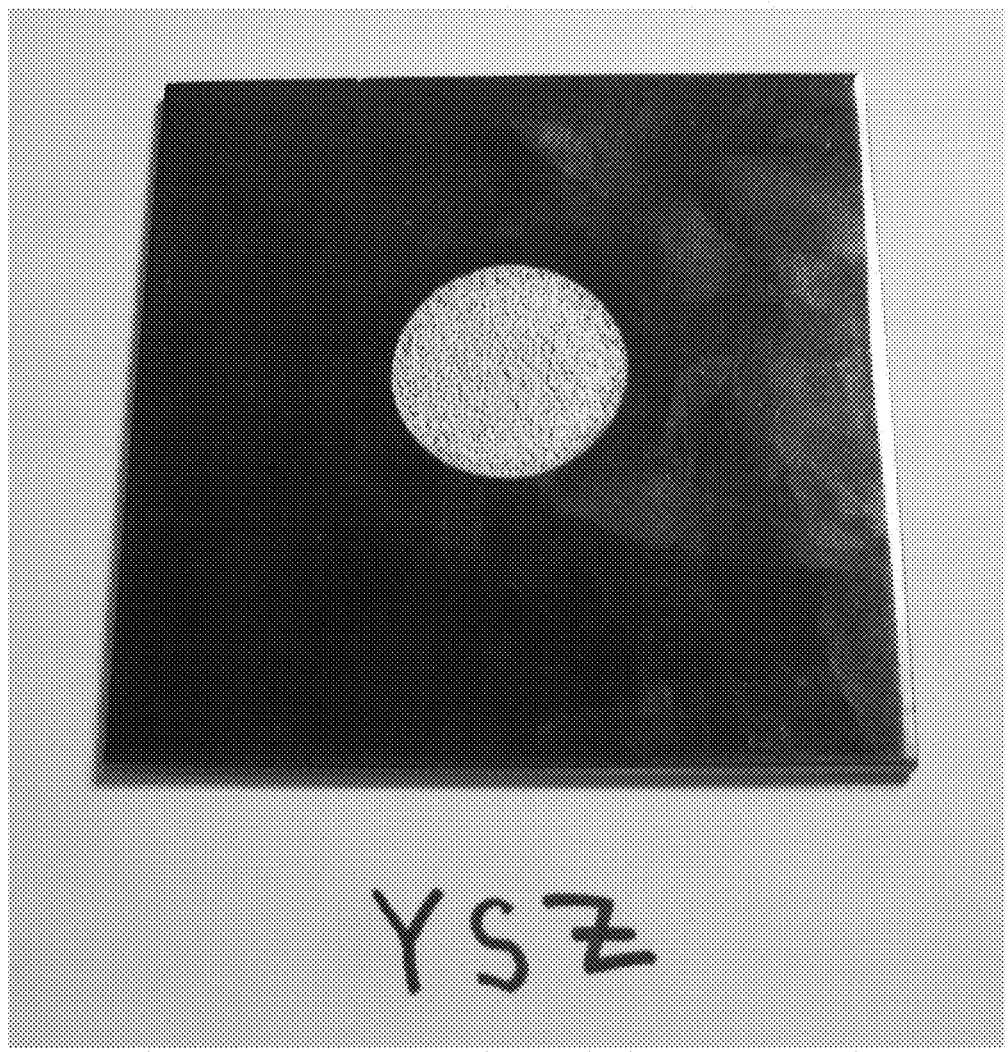
FIG. 5 shows a photograph of a steel coupon coated with "YSZ" after one hour exposed to Aqua Regia.
Figure 6:
FIG. 6 shows a photograph of a steel coupon coated with "Clay" after one hour exposed to Aqua Regia.

As used herein, the term "rare earth metal" includes those metals in the lanthanide series of the Periodic Table, including lanthanum. The term "transition metal" includes metals in Groups 3-12 of the Periodic Table (but excludes rare earth metals). The term "metal oxide" particularly as used in conjunction with the above terms includes any oxide that can form or be prepared from the metal, irrespective of whether it is naturally occurring or not. The "metal" atoms of the metal oxides of the present invention are not necessarily limited to those elements that readily form metallic phases in the pure form. "Metal compounds" include substances such as molecules comprising at least one metal atom and at least one oxygen atom. Metal compounds can be converted into metal oxides by exposure to a suitable environment for a suitable amount of time.

As used herein, the term "phase deposition" includes any coating process onto a substrate that is subsequently followed by the exposure of the substrate and/or the coating material to an environment that causes a phase change in either the coating material, one or more components of the coating material, or of the substrate itself. A phase change may be a physical phase change, such as for example, a change from fluid to solid, or from one crystal phase to another, or from amorphous to crystalline or vice versa. "Adaptable to provide" indicates the ability to make available. For example, an "article adaptable to provide a surface in a fluid processing or transport system" is an article, such as a pipe, that has a surface that is or can be assembled into such a system by using manufacturing, construction, and/or assembly steps.

The term alkyl, as used herein, refers to a saturated straight, branched, or cyclic hydrocarbon, or a combination thereof, typically of $C_1$ to $C_{24}$, and specifically includes methyl, ethyl, n-propyl, isopropyl, n-butyl, isobutyl, t-butyl, n-pentyl, cyclopentyl, isopentyl, neopentyl, n-hexyl, isohexyl, cyclohexyl, 3-methylpentyl, 2,2-dimethylbutyl, 2,3-dimethylbutyl, heptyl, octyl, nonyl, and decyl.

The term alkoxy, as used herein, refers to a saturated straight, branched, or cyclic hydrocarbon, or a combination thereof, typically of $C_1$ to $C_{24}$, and specifically includes methyl, ethyl, n-propyl, isopropyl, n-butyl, isobutyl, t-butyl, n-pentyl, cyclopentyl, isopentyl, neopentyl, n-hexyl, isohexyl, cyclohexyl, 3-methylpentyl, 2,2-dimethylbutyl, 2,3-dimethylbutyl, heptyl, octyl, nonyl, and decyl, in which the hydrocarbon contains a single-bonded oxygen atom that can bond to or is bonded to another atom or molecule.

The terms alkenyl and alkynyl, as used herein, refer to $C_1$ to $C_{24}$ straight, branched, or cyclic hydrocarbon with at least one double or triple bond, respectively.

The term aryl or aromatic, as used herein, refers to 5- to 12-membered monocyclic or bicyclic hydrocarbon ring molecule having conjugated double bonds about the ring. The ring may be unsubstituted or substituted having one or more alike or different independently-chosen substituents, wherein the substituents are chosen from alkyl, alkenyl, alkynyl, alkoxy, hydroxyl, and amino radicals, and halogen atoms. Aryl includes, for example, unsubstituted or substituted phenyl and unsubstituted or substituted naphthyl.

The term heteroaryl as used herein refers to a five- to twelve-membered monocyclic or bicyclic aromatic hydrocarbon ring molecule having at least one heteroatom chosen from O, N, P, and S as a member of the ring, and the ring is unsubstituted or substituted with one or more alike or different substituents independently chosen from alkyl, alkenyl, alkynyl, hydroxyl, alkoxy, amino, alkylamino, dialkylamino, thiol, alkylthio, =O, =NH, =PH, =S, and halogen atoms.

The term hydrocarbon refers to molecules that contain carbon and hydrogen.

"Alike or different," when describing three or more substituents for example, indicates combinations in which (a) all substituents are alike, (b) all substituents are different, and (c) some substituents are alike but different from other substituents.

Suitable metal compound precursors to form metal oxides include substances such as molecules containing at least one metal atom and at least one oxygen atom. In some embodiments, metal compounds that form metal oxides include metal carboxylates, metal alkoxides, and metal β-diketonates.

A. Metal Carboxylates

The metal salts of carboxylic acids useful in the present invention can be made from any suitable carboxylic acids according to methods known in the art. For example, U.S. Pat. No. 5,952,769 to Budaragin discloses suitable carboxylic acids and methods of making metal salts of carboxylic acids, among other places, at columns 5-6. The disclosure of U.S. Pat. No. 5,952,769 is incorporated herein by reference. In some embodiments, the metal carboxylate can be chosen from metal salts of 2-hexanoic acid. Moreover, suitable metal carboxylates can be purchased from chemical supply companies. For example, cerium(III) 2-ethylhexanoate, magnesium(II) stearate, manganese(II) cyclohexanebutyrate, and zinc(II) methacrylate are available from Sigma-Aldrich of St. Louis, Mo. See Aldrich Catalogue, 2005-2006. Additional metal carboxylates are available from, for example, Alfa-Aesar of Ward Hill, Mass.

The metal carboxylate composition, in some embodiments of the present invention, comprises one or more metal salts of one or more carboxylic acid ("metal carboxylate"). Metal carboxylates suitable for use in the present invention include at least one metal atom and at least one carboxylate radical —OC(O)R bonded to the at least one metal atom. As stated above, metal carboxylates can be produced by a variety of methods known to one skilled in the art. Non-limiting examples of methods for producing the metal carboxylate are shown in the following reaction schemes:

$nRCOOH + Me \rightarrow (RCOO)_n Me^{n+} + 0.5nH_2$ (for alkaline earth metals, alkali metals, and thallium).

$nRCOOH + Me^{n+}(OH)_n \rightarrow (RCOO)_n Me^{n+} + nH_2O$ (for practically all metals having a solid hydroxide).

$nRCOOH + Me^{n+}(CO_3)_{0.5n} \rightarrow (RCOO)_n Me^{n+} + 0.5nH_2O + 0.5nCO_2$ (for alkaline earth metals, alkali metals, and thallium).

$nRCOOH + Me^{n+}(X)_{n/m} \rightarrow (RCOO)_n Me^{n+} + n/mH_mX$ (liquid extraction, usable for practically all metals having solid salts).

In the foregoing reaction schemes, X is an anion having a negative charge m, such as, e.g., halide anion, sulfate anion, carbonate anion, phosphate anion, among others; n is a positive integer; and Me represents a metal atom.

R in the foregoing reaction schemes can be chosen from a wide variety of radicals. Suitable carboxylic acids for use in making metal carboxylates include, for example:

Monocarboxylic acids:

Monocarboxylic acids where R is hydrogen or unbranched hydrocarbon radical, such as, for example, HCOOH—formic, $CH_3COOH$—acetic, $CH_3CH_2COOH$—propionic, $CH_3CH_2CH_2COOH(C_4H_8O_2)$—butyric, $C_5H_{10}O_2$—valeric, $C_6H_{12}O_2$—caproic, $C_7H_{14}$—enanthic; further: caprylic, pelargonic, undecanoic, dodecanoic, tridecylic, myristic, pentadecylic, palmitic, margaric, stearic, and nonadecylic acids;

Monocarboxylic acids where R is a branched hydrocarbon radical, such as, for example, $(CH_3)_2CHCOOH$—isobutyric, $(CH_3)_2CHCH_2COOH$-3—methylbutanoic, $(CH_3)_3CCOOH$—trimethylacetic, including VERSATIC 10 (trade name) which is a mixture of synthetic, saturated carboxylic acid isomers, derived from a highly-branched $C_{10}$ structure;

Monocarboxylic acids in which R is a branched or unbranched hydrocarbon radical containing one or more double bonds, such as, for example, $CH_2=CHCOOH$—acrylic, $CH_3CH=CHCOOH$—crotonic, $CH_3(CH_2)_7CH=CH(CH_2)_7COOH$—oleic, $CH_3CH=CHCH=CHCOOH$—hexa-2,4-dienoic, $(CH_3)_2C=CHCH_2CH_2C(CH_3)=CHCOOH$—3,7-dimethylocta-2,6-dienoic, $CH_3(CH_2)_4CH=CHCH_2CH=CH(CH_2)_7COOH$—linoleic, further: angelic, tiglic, and elaidic acids;

Monocarboxylic acids in which R is a branched or unbranched hydrocarbon radical containing one or more triple bonds, such as, for example, $CH\equiv CCOOH$—propiolic, $CH_3C\equiv CCOOH$—tetrolic, $CH_3(CH_2)_4C\equiv CCOOH$—oct-2-ynoic, and stearolic acids;

Monocarboxylic acids in which R is a branched or unbranched hydrocarbon radical containing one or more double bonds and one or more triple bonds;

Monocarboxylic acids in which R is a branched or unbranched hydrocarbon radical containing one or more double bonds and one or more triple bonds and one or more aryl groups;

Monohydroxymonocarboxylic acids in which R is a branched or unbranched hydrocarbon radical that contains one hydroxyl substituent, such as, for example, $HOCH_2COOH$—glycolic, $CH_3CHOHCOOH$—lactic, $C_6H_5CHOHCOOH$—amygdalic, and 2-hydroxybutyric acids;

Dihydroxymonocarboxylic acids in which R is a branched or unbranched hydrocarbon radical that contains two hydroxyl substituents, such as, for example, $(HO)_2CHCOOH$—2,2-dihydroxyacetic acid;

Dioxycarboxylic acids, in which R is a branched or unbranched hydrocarbon radical that contains two oxygen atoms each bonded to two adjacent carbon atoms, such as, for example, $C_6H_3(OH)_2COOH$—dihydroxy benzoic, $C_6H_2(CH_3)(OH)_2COOH$—orsellinic; further: caffeic, and piperic acids;

Aldehyde-carboxylic acids in which R is a branched or unbranched hydrocarbon radical that contains one aldehyde group, such as, for example, CHOCOOH—glyoxalic acid;

Keto-carboxylic acids in which R is a branched or unbranched hydrocarbon radical that contains one ketone group, such as, for example, $CH_3COCOOH$—pyruvic, $CH_3COCH_2COOH$—acetoacetic, and $CH_3COCH_2CH_2COOH$—levulinic acids;

Monoaromatic carboxylic acids, in which R is a branched or unbranched hydrocarbon radical that contains one aryl substituent, such as, for example, C₆H₅COOH—benzoic, C₆H₅CH₂COOH—phenylacetic, C₆H₅CH(CH₃)COOH—2-phenylpropanoic, C₆H₅CH═CHCOOH—3-phenylacrylic, and C₆H₅C≡CCOOH—3-phenyl-propiolic acids;

Multicarboxylic acids:

Saturated dicarboxylic acids, in which R is a branched or unbranched saturated hydrocarbon radical that contains one carboxylic acid group, such as, for example, HOOC—COOH—oxalic, HOOC—CH₂—COOH—malonic, HOOC—(CH₂)₂—COOH—succinic, HOOC—(CH₂)₃—COOH—glutaric, HOOC—(CH₂)₄—COOH—adipic; further: pimelic, suberic, azelaic, and sebacic acids;

Unsaturated dicarboxylic acids, in which R is a branched or unbranched hydrocarbon radical that contains one carboxylic acid group and at least one carbon-carbon multiple bond, such as, for example, HOOC—CH═CH—COOH—fumaric; further: maleic, citraconic, mesaconic, and itaconic acids;

Polybasic aromatic carboxylic acids, in which R is a branched or unbranched hydrocarbon radical that contains at least one aryl group and at least one carboxylic acid group, such as, for example, C₆H₄(COOH)₂—phthalic (isophthalic, terephthalic), and C₆H₃(COOH)₃—benzyl-tri-carboxylic acids;

Polybasic saturated carboxylic acids, in which R is a branched or unbranched hydrocarbon radical that contains at least one carboxylic acid group, such as, for example, ethylene diamine N,N'-diacetic acid, and ethylene diamine tetraacetic acid (EDTA);

Polybasic oxyacids:

Polybasic oxyacids, in which R is a branched or unbranched hydrocarbon radical containing at least one hydroxyl substituent and at least one carboxylic acid group, such as, for example, HOOC—CHOH—COOH—tartronic, HOOC—CHOH—CH₂—COOH—malic, HOOC—C(OH)═CH—COOH—oxaloacetic, HOOC—CHOH—COOH—tartaric, and HOOC—CH₂—C(OH)COOH—CH₂COOH—citric acids.

In some embodiments, the monocarboxylic acid comprises one or more carboxylic acids having the formula I below:

$$R—C(R'')(R')—COOH \quad (I)$$

wherein:
R is selected from H or $C_1$ to $C_{24}$ alkyl groups; and
R' and R'' are each independently selected from H and $C_1$ to $C_{24}$ alkyl groups;
wherein the alkyl groups of R, R', and R'' are optionally and independently substituted with one or more substituents, which are alike or different, chosen from hydroxy, alkoxy, amino, and aryl radicals, and halogen atoms.

Some suitable alpha branched carboxylic acids typically have an average molecular weight in the range 130 to 420. In some embodiments, the carboxylic acids have an average molecular weight in the range 220 to 270. The carboxylic acid may also be a mixture of tertiary and quaternary carboxylic acids of formula I. VIK acids can be used as well. See U.S. Pat. No. 5,952,769, at col. 6, ll. 12-51.

Either a single carboxylic acid or a mixture of carboxylic acids can be used to form the metal carboxylate composition. In some embodiments, a mixture of carboxylic acids is used. In still other embodiments, the mixture contains 2-ethylhexanoic acid where R is H, R'' is $C_2H_5$ and R' is $C_4H_9$. In some embodiments, this acid is the lowest boiling acid constituent in the mixture. When a mixture of metal carboxylates is used, the mixture has a broader evaporation temperature range, making it more likely that the evaporation temperature of the mixture will overlap the metal carboxylate decomposition temperature, allowing the formation of a solid metal oxide coating. Moreover, the possibility of using a mixture of carboxylates avoids the need and expense of purifying an individual carboxylic acid.

B. Metal Alkoxides

Metal alkoxides suitable for use in the present invention include at least one metal atom and at least one alkoxide radical —OR² bonded to the at least one metal atom. Such metal alkoxides include those of formula II:

$$M(OR^2)_z \quad (II)$$

in which M is a metal atom of valence z+;
z is a positive integer, such as, for example, 1, 2, 3, 4, 5, 6, 7, and 8;
R² can be alike or different and are independently chosen from unsubstituted and substituted alkyl, unsubstituted and substituted alkenyl, unsubstituted and substituted alkynyl, unsubstituted and substituted heteroaryl, and unsubstituted and substituted aryl radicals,
wherein substituted alkyl, alkenyl, alkynyl, heteroaryl, and aryl radicals are substituted with one or more alike or different substituents independently chosen from halogen, hydroxy, alkoxy, amino, heteroaryl, and aryl radicals.

In some embodiments, z is chosen from 2, 3, and 4.

Metal alkoxides are available from Alfa-Aesar and Gelest, Inc., of Morrisville, Pa. Lanthanoid alkoxides such as those of Ce, Nd, Eu, Dy, and Er are sold by Kojundo Chemical Co., Saitama, Japan, as well as alkoxides of Al, Zr, and Hf, among others. See, e.g., http://www.kojundo.co.jp/English/Guide/material/lanthagen.html.

Examples of metal alkoxides useful in embodiments of the present invention include methoxides, ethoxides, propoxides, isopropoxides, and butoxides and isomers thereof. The alkoxide substituents on a give metal atom are the same or different. Thus, for example, metal dimethoxide diethoxide, metal methoxide diisopropoxide t-butoxide, and similar metal alkoxides can be used. Suitable alkoxide substituents also may be chosen from:

1. Aliphatic series alcohols from methyl to dodecyl including branched and isostructured.
2. Aromatic series alcohols: benzyl alcohol—C₆H₅CH₂OH; phenyl-ethyl alcohol—C₈H₁₀O; phenyl-propyl alcohol—C₉H₁₂O, and so on.

Metal alkoxides useful in the present invention can be made according to many methods known in the art. One method includes converting the metal halide to the metal alkoxide in the presence of the alcohol and its corresponding base. For example:

$$MX_z + zHOR^2 \rightarrow M(OR^2)_z + zHX$$

in which M, R², and z are as defined above for formula II, and X is a halide anion.

C. Metal β-Diketonates

Metal β-diketonates suitable for use in the present invention contain at least one metal atom and at least one β-diketone of formula III as a ligand:

(III)

in which $R^3$, $R^4$, $R^5$, and $R^6$ are alike or different, and are independently chosen from hydrogen, unsubstituted and substituted alkyl, unsubstituted and substituted alkoxy, unsubstituted and substituted alkenyl, unsubstituted and substituted alkynyl, unsubstituted and substituted heteroaryl, unsubstituted and substituted aryl, carboxylic acid groups, ester groups having unsubstituted and substituted alkyl, and combinations thereof, wherein substituted alkyl, alkoxy, alkenyl, alkynyl, heteroaryl, and aryl radicals are substituted with one or more alike or different substituents independently chosen from halogen atoms, hydroxy, alkoxy, amino, heteroaryl, and aryl radicals.

It is understood that the β-diketone of formula III may assume different isomeric and electronic configurations before and while chelated to the metal atom. For example, the free β-diketone may exhibit enolate isomerism. Also, the β-diketone may not retain strict carbon-oxygen double bonds when the molecule is bound to the metal atom.

Examples of β-diketones useful in embodiments of the present invention include acetylacetone, trifluoroacetylacetone, hexafluoroacetylacetone, 2,2,6,6-tetramethyl-3,5-heptanedione, 6,6,7,7,8,8,8-heptafluoro-2,2-dimethyl-3,5-octanedione, ethyl acetoacetate, 2-methoxyethyl acetoacetate, benzoyltrifluoroacetone, pivaloyltrifluoroacetone, benzoyl-pyruvic acid, and methyl-2,4-dioxo-4-phenylbutanoate.

Other ligands are possible on the metal β-diketonates useful in the present invention, such as, for example, alkoxides such as —$OR^2$ as defined above, and dienyl radicals such as, for example, 1,5-cyclooctadiene and norbornadiene.

Metal β-diketonates useful in the present invention can be made according to any method known in the art. β-diketones are well known as chelating agents for metals, facilitating synthesis of the diketonate from readily available metal salts.

Metal β-diketonates are available from Alfa-Aesar and Gelest, Inc. Also, Strem Chemicals, Inc. of Newburyport, Mass., sells a wide variety of metal β-diketonates on the internet at http://www.strem.com/code/template.ghc?direct=cvdindex.

In some embodiments, the method of the invention can include a pre-application cleaning step prior to the application of the composition. In these embodiments, the invention involves the application of one or more cleaning materials, which may be in vapor, liquid, semi-solid phase, or a combination of these to at least a portion of the surfaces of the final system, followed by a flushing and drying cycle at a drying temperature. The cleaning technique can be of the type used for cleaning surfaces prior to coating, plating, painting, or similar surface treatments. The pre-application cleaning step may also include a pickling operation using known chemicals and process in order to prepare the surface(s) for coating.

Some embodiments of the present invention provide a method for decreasing or preventing fouling on a surface of a sensor, or a component thereof. Further embodiments provide a sensor comprising at least one surface comprising at least one metal oxide. In still further embodiments, the at least one surface of the sensor comprises at least one metal oxide, in which at least some of the at least one metal oxide is present in a diffused coating. Sensors may contain more than one part, including but not limited to the sensing element(s), mounting structures, and feedback means such as for example wiring which may be in protective cladding. Each of those parts have surfaces that may benefit from a metal oxide coating; one or more of those surfaces can be coated in accordance with the invention. Sensors that appear in embodiments of the present invention include, but are not limited to, sight glasses, for example a sight glass on a boiler, thermocouples, resistance thermal devices (RTDs), pressure sensors, flow rate and mass flow sensors, airspeed sensors, piezoelectric sensors, photo-optic combustion sensors, high temperature chromatographs, optical sensors, UV sensors, infra red sensors, electromagnetic field sensors, electromagnetic wave sensors, radiation sensors, toxic chemical sensors, gas analyzers, oxygen sensors, nitrogen sensors, $NO_x$ sensors, $SO_x$ sensors, $CO_2$ sensors, CO sensors, diesel exhaust soot sensors, other soot sensors, $H_2S$ sensors, and humidity sensors, among others. Care should be taken so that the applying of the at least one metal compound and the converting to at least one metal oxide are accomplished to minimize or avoid damage to the sensor, or to avoid inhibiting sensor operation. Damage can be minimized or avoided, in some embodiments, by converting at a lower temperature, or without substantially heating the surface. Alternatively, in other embodiments, non-sensing element surfaces can receive at least one metal oxide coating before the sensing element(s) is/are assembled into the sensor.

Some embodiments of the present invention provide a metal oxide coating on a surface that is subject to coke buildup. Such surfaces include, but are not limited to, one or more surfaces of:

the heaters, heat exchangers, vacuum tower, and pipes that contact the heavier fractions in a crude unit or a vacuum unit;

the furnace, heater tubes, furnace outlets, and pipes of an ethylene cracker unit;

the heaters, heater tubes, fractionator bottoms, stripper bottoms, heat exchangers, and pipes of a delayed coker unit or a viscosity breaker;

the cyclone dip legs and stripper baffles of the reactor, the reactor overhead line, the spent catalyst return line, the plenum of the catalyst regenerator, and the bottom and lower trays of the fractionator of a fluid catalytic cracking unit;

the heaters, heater tubes, reactors, product pipes, catalyst transfer pipes, and valves of a continuous catalytic reforming unit;

the heaters, heater tubes, reactors, and pipes in a fixed bed catalytic reforming unit; and the reactors, heaters, heat exchangers, and pipes of a syngas generation unit.

Other embodiments provide a metal oxide coating on a surface that is subject to corrosive attack by one or more species present in the process stream. Such surfaces include, but are not limited to, one or more surfaces of:

the furnaces, towers, strippers, reheaters, heat exchangers, and pipes of a crude unit or a vacuum unit;

the fractionators, strippers, compressors, heat exchangers, and pipes of a delayed coker unit;

a fractionator and pipes therefrom of a fluid catalytic cracking unit;

on the knock-out drums, pipes, compressors, reheaters, and heat exchangers of a catalytic cracker's light ends recovery unit;

the heat exchangers, product separators, debutanizer, overhead condensers, overhead drums, and pipes of a continuous catalytic reforming unit;

the reactors, stabilizers, accumulators, heat exchangers, and pipes of a fixed bed catalytic reforming unit;

the reactors, heaters, water washers, separators, hydrogen recycle compressors, strippers, heat exchangers, pumps, and pipes of a hydrotreating, hydrodesulfuring, or hydrocracking unit;

the trays, pipes, pumps, and bottoms of a sulfuric acid alkylation unit, including the outside surfaces of pipes that may be enclosed in insulation;

the settler, acid regenerator, acid vaporizer, fractionator, reboiler, strippers, condensers, recyclers, heat exchangers, defluorinators, KOH treaters, pumps, and pipes of an HF or sulfuric acid alkylation unit; and the reactor, separator, pumps, and pipes of a biodiesel refining unit.

The skilled artisan will appreciate that more than one mechanism can operate to degrade the same surface. Accordingly, the foregoing embodiments do not suggest exclusive mechanisms for any given surface.

Still other embodiments of the present invention provide methods for reducing or preventing combustion buildup on a flame-heated surface of a fluid processing or transport system, or a component thereof. That combustion buildup can be any material that deposits on such surfaces, including, for example, slag, scale, coke, soot, and combinations thereof. A flame-heated surface includes any surface exposed to fuel combustion and its products, such as, for example, those surfaces exposed to the flame, smoke, soot, and/or fumes of combustion, even if that surface is not directly contacted by a flame. Such surfaces include, but are not limited to, insides of furnaces, preheaters, reheaters, and smoke stacks; outsides of boilers, heater tubes, and flame-heated reactors; as well as fuel conduits, valves, vents, burners, combustion control devices, ash conduits, and the like proximate to the combustion area. A flame-heated surface does not necessarily include process fluid-contacting surfaces. To illustrate, it is contemplated that heat is transferred from the flame-heated surface through the vessel wall to the process fluid-contacting surface. Thus, a vessel wall has in general two surfaces, the flame-heated surface and the process fluid-contacting surface.

Further embodiments provide methods for reducing or preventing fouling of at least one metal surface of a combustion engine system, or a component thereof. Combustion engine systems include, but are not limited to, internal combustion engines, two-stroke engines, four-stroke engines, gasoline engines, diesel engines, turboprop engines, jet engines, gas turbines, and rocket engines. Suitable metal surfaces include, but are not limited to, jet, turbojet, turbofan, ram jet, scram jet, and turbine engine surfaces including inlet, compressor, turbine, blades, recuperators, afterburner, nozzle, thrust vector surfaces, and fuel delivery components; internal combustion engine surfaces including pistons, rotors, cylinders, housings, piston rings, seals, endplates, cylinder heads, valve heads, valve stems, valve seats, valve faces, valve train components, cams, pushrods, cam followers, rocker arms, valve springs, valve guides, combustion chambers, crankcases, intake system components, supercharger components, exhaust manifolds, exhaust gas recirculation pipes and valves, turbocharger components, catalytic converter components, exhaust pipes, fuel injectors, and fuel pumps; and rocket engine surfaces including inlets, fuel delivery systems, fuel combustion zones, and thrust vector surfaces. In some embodiments, the metal oxide coating of the metal surface of a combustion engine system is an oxidizing coating. In further embodiments, the metal oxide coating further comprises at least one metal. Metals that may be desired, such as for catalytic purposes, for example, include but are not limited to platinum, palladium, rhodium, nickel, cerium, gold, silver, zinc, lead, rhenium, ruthenium, and combinations of two or more thereof.

Still other embodiments provide a fluid processing or transport system comprising at least one surface comprising at least one metal oxide coating, in which the system has a large size. A large size is useful for commercial scale processes. Industrial fluid processing or transport systems include, but are not limited to, oil refineries; oil refinery subsystems such as crude units, atmospheric units, vacuum units, delayed cokers, fluid catalytic crackers, fixed bed catalytic crackers, continuous catalytic reformers, naphtha reformers, hydrotreaters, hydrocrackers, alkylators including sulfuric acid alkylators and HF alkylators, amine treaters, sulfur recovery units, sour water strippers, isomerization units, and hydrogen reforming units; waste water treatment plants; cooling water systems such as those found in manufacturing plants and power plants; desalinization plants; and processing systems found in colorants manufacturing, cosmetics manufacturing, food processing, chemical manufacturing, pharmaceutical manufacturing, and the like.

In some embodiments, the surface of the fluid processing or transport system to receive a metal oxide coating in accordance with the present invention has a surface area greater than about 100 square feet. In other embodiments, the surface area ranges between about 100 square feet to about 500 square feet, between about 500 square feet to about 1,000 square feet, between about 1,000 square feet to about 10,000 square feet, between about 10,000 square feet to about 20,000 square feet, between about 20,000 square feet to about 50,000 square feet, between about 50,000 square feet to about 100,000 square feet, between about 100,000 square feet to about 1,000,000 square feet, between about 1,000,000 square feet to about 10,000,000 square feet, between about 10,000,000 square feet to about 1 square mile, between about 1 square mile to about 5 square miles, between about 5 square miles to about 10 square miles, or greater than about 10 square miles.

The surface to be treated according to the invention also can be pretreated, in further embodiments, before the application of the composition. In some cases, the surface can be etched according to known methods, for example, with an acid wash comprising nitric acid, sulphuric acid, hydrochloric acid, phosphoric acid, or a combination of two or more thereof, or with a base wash comprising sodium hydroxide or potassium hydroxide, for example. In further cases, the surface can be mechanically machined or polished, with or without the aid of one or more chemical etching agents, abrasives, and polishing agents, to make the surface either rougher or smoother. In still further cases, the surface can be pretreated such as by carburizing, nitriding, painting, powder coating, plating, or anodizing. Thin films of chrome, tin, and other elements, alone or in combination, can be deposited, in some embodiments. Methods for depositing thin films are well known and include chemical vapor deposition, physical vapor deposition, molecular beam epitaxy, plasma spraying, electroplating, ion impregnation, and others.

In some embodiments of the present invention, a metal compound comprises a transition metal atom. In other embodiments, a metal compound comprises a rare earth metal atom. In further embodiments, the metal compound composition comprises a plurality of metal compounds. In some embodiments, a plurality of metal compounds comprises at least one rare earth metal compound and at least one transition metal compound. Metal carboxylates, metal alkoxides, and metal β-diketonates can be chosen for some embodiments of the present invention.

In further embodiments, a metal compound mixture comprises one metal compound as its major component and one or more additional metal compounds which may function as stabilizing additives. Stabilizing additives, in some embodiments, comprise trivalent metal compounds. Trivalent metal compounds include, but are not limited to, chromium, iron, manganese, and nickel compounds. A metal compound composition, in some embodiments, comprises both cerium and chromium compounds.

In some embodiments, the metal compound that is the major component of the metal compound composition contains an amount of metal that ranges from about 65 to about 97% by weight or from about 80 to about 87% by weight of the total weight of metal in the composition. In other embodiments, the amount of metal forming the major component of the metal compound composition ranges from about 90 to about 97% by weight of the total metal present in the composition. In still other embodiments, the amount of metal forming the major component of the metal compound composition ranges from about 97 to about 100% by weight of the total metal present in the composition.

The metal compounds that may function as stabilizing additives, in some embodiments, may be present in amounts such that the total amount of the metal in metal compounds which are the stabilizing additives is at least 3% by weight, relative to the total weight of the metal in the metal compound composition. This can be achieved in some embodiments by using a single stabilizing additive, or multiple stabilizing additives, provided that the total weight of the metal in the stabilizing additives is greater than 3%. In other embodiments, the amount of the stabilizing metal is less than 3% relative to the total weight of metal in the metal compound composition. In yet other embodiments, the total weight of the metal in the stabilizing additives ranges from about 3% to about 35% by weight. In still other embodiments, the total weight for the metal in the stabilizing additives ranges from about 3 to about 30% by weight, relative to the total weight of the metal in the metal compound composition. In other embodiments, the total weight range for the metal in the stabilizing additives ranges from about 3 to about 10% by weight. In some embodiments, the total weight range for the metal in the stabilizing additives is from about 7 to about 8% by weight, relative to the total weight of the metal in the metal compound composition. Still other embodiments provide the stabilizing metal in an amount greater than about 35% by weight relative to the total weight of the metal in the metal compound composition.

The amount of metal in the metal compound composition, according to some embodiments, ranges from about 20 to about 150 grams of metal per kilogram of metal compound composition. In other embodiments, the amount of metal in the metal compound composition ranges from about 30 to about 50 grams of metal per kilogram of metal compound composition. In further embodiments, the metal compound composition can contain from about 30 to about 40 grams of metal per kg of composition. Amounts of metal less than 20 grams of metal per kilogram of metal compound composition or greater than about 150 grams of metal per kilogram of metal compound composition also can be used.

The metal compound may be present in any suitable composition. Finely divided powder, nanoparticles, solution, suspension, multi-phase composition, gel, vapor, aerosol, and paste, among others, are possible.

The metal compound composition may also include nanoparticles in the size range of less than 100 nm in average size and being composed of a variety of elements or combination thereof, for example, $Al_2O_3$, $CeO_2$, $Ce_2O_3$, $TiO_2$, $ZrO_2$ and others. In some cases, the nanoparticles can be dispersed, agglomerated, or a mixture of dispersed and agglomerated nanoparticles. Nanoparticles may have a charge applied to them, negative or positive, to aid dispersion. Moreover, dispersion agents, such as known acids or surface modifying agents, may be used. The presence of nanoparticles may decrease the porosity of the final coating; the level of porosity will generally decrease with increasing quantity and decreasing size of the included nanoparticles. Coating porosity can also be influenced by applying additional coating layers according to the process of the invention; porosity will generally decrease with an increasing number of layers. In some embodiments the nanoparticles may be first mixed with a liquid and then mixed with the compound composition; this method provides a means to create a fine dispersion in a first liquid which retains its dispersion when mixed with a second, or third liquid. For example, nanoparticles of chosen elements, oxides, molecules, or alloys may be dispersed into a first liquid and, after a desired quality of dispersion is achieved, the nanoparticles in the first liquid may be mixed with the liquid metal compound composition prior to the exposure of the final composition to an environment that will convert at least a portion of the metal compound(s) into metal oxides. The result may be a more dense film with reduced porous sites.

The applying of the metal compound composition may be accomplished by various processes, including dipping, spraying, flushing, vapor deposition, printing, lithography, rolling, spin coating, brushing, swabbing (e.g., with an absorbent "pig" of fabric or other material that contains the metal compound composition and is drawn through the apparatus), pig train (in which the metal compound composition, trapped between two or more pigs, is pushed through a system by compressed air, for example), or any other means that allows the metal compound composition to contact the desired portions of the surface to be treated. In this regard, the metal compound composition may be liquid, and may also comprise a solvent. The optional solvent may be any hydrocarbon and mixtures thereof. In some embodiments, the solvent can be chosen from carboxylic acids; toluene; benzene; alkanes, such as for example, propane, butane, isobutene, hexane, heptane, octane, and decane; alcohols, such as methanol, ethanol, n-propanol, isopropanol, n-butanol, and isobutanol; mineral spirits; β-diketones, such as acetylacetone; ketones such as acetone; high-paraffin, aromatic hydrocarbons; and combinations of two or more of the foregoing. Some embodiments employ solvents that contain no water or water in trace amounts or greater, while other embodiments employ water as the solvent. In some embodiments, the metal compound composition further comprises at least one carboxylic acid.

The metal compound composition can applied in some embodiments in which the composition has a temperature less than about 250° C. That composition also can be applied to the substrate in further embodiments at a temperature less than about 50° C. In other embodiments, the liquid metal compound composition is applied to the substrate at room temperature. In still other embodiments, that composition is applied at a temperature greater than about 250° C.

Following application, the at least one metal compound is at least partially converted to at least one metal oxide. In some embodiments the at least one metal compound is fully converted to at least one metal oxide.

Suitable environments for converting the at least one metal compound into at least one metal oxide include vacuum, partial vacuum, atmospheric pressure, high pressure equal to several atmospheres, high pressure equal to several hundred atmospheres, inert gases, and reactive gases such as gases comprising oxygen, including pure oxygen, air, dry air, and mixtures of oxygen in various ratios with one or more other gases such as nitrogen, carbon dioxide, helium, neon, and argon, as well as hydrogen, mixtures of hydrogen in various ratios with one or more other gases such as nitrogen, carbon dioxide, helium, neon, and argon, also other gases such as, for example, nitrogen, $NH_3$, hydrocarbons, $H_2S$, $PH_3$, each alone or in combination with various gases, and still other gases which may or may not be inert in the converting environment. That environment may be heated relative to ambient conditions, in some embodiments. In other embodiments, that environment may comprise reactive species that cause or catalyze the conversion of the metal compound to the metal oxide, such as, for example, acid-catalyzed hydrolysis of metal alkoxides. In still other embodiments, the metal compound is caused to convert to the metal oxide by the use of induction heating or lasers, as explained below.

The conversion environment may be accomplished in a number of ways. For example, a conventional oven may be used to bring the coated substrate up to a temperature exceeding approximately 250° C. for a given period of time. In some embodiments, the environment of the coated substrate is heated to a temperature exceeding about 400° C. but less than about 500° C. for a chosen period of time. In other embodiments, the environment of the coated substrate is heated to a temperature ranging from about 400° C. to about 650° C. In further embodiments, the environment is heated to a temperature ranging from about 400° C. to about 550° C. In still further embodiments, the environment is heated to a temperature ranging from about 550° C. to about 650° C., from about 650° C. to about 800° C., or from about 800° C. to about 1000° C. Depending on the size of the components and/or process equipment, pipes, etc., the time period may be extended such that sufficient conversion of a desired amount of the metal compound to metal oxides has been accomplished.

In some applications, the oxidation of the surface being treated is not desired. In these cases, an inert atmosphere may be provided in the conversion environment to prevent such oxidation. In the case of heating the component in a conventional oven, a nitrogen or argon atmosphere can be used, among other inert gases, to prevent or reduce the oxidation of the surface prior to or during the conversion process.

The conversion environment may also be created using induction heating through means familiar to those skilled in the art of induction heating. Alternatively, the conversion environment may be provided using a laser applied to the surface area for sufficient time to allow at least some of the metal compounds to convert to metal oxides. In other applications, the conversion environment may be created using an infra-red light source which can reach sufficient temperatures to convert at least some of the metal compounds to metal oxides. Some embodiments may employ a microwave emission device to cause at least some of the metal compound to convert. In the case of induction heating, microwave heating, lasers, and other heating methods that can produce the necessary heat levels in a short time, for example, within seconds, 1 minute, 10 minutes, 20 minutes, 30 minutes, 40 minutes, or one hour. Accordingly, in some embodiments, the conversion environment can be created without the use of an inert gaseous environment, thus enabling conversion to be done in open air, outside of a closed system due to the reduced time for undesirable compounds to develop on the material's surface in the presence of ambient air.

The gas above the metal compound on the surface can be heated, in some embodiments, to convert the metal compound to the metal oxide. Heating can be accomplished by introducing high temperature process gases, which are fed through the assembled fluid transport or processing system, wherein the joints, welds, connections, and one or more interior surfaces of the fluid transport or processing system become covered with a protective thin film of the desired metal oxide(s). This high temperature gas can be produced by a conventional oven, induction heating coils, heat exchangers, industrial process furnaces, exothermic reactions, microwave emission, or other suitable heating method.

If there are elements of the assembled process system and components or surfaces on which it is not desired to have nanocrystalline layer applied (e.g. fluid beds, catalytic surfaces, etc.), these can be temporarily bypassed using known methods of piping, valves, ports, etc. during one or more steps of the method of the invention, be it during the application of a composition to the inner surfaces or during the high temperature conversion stage, or a combination thereof. Likewise, areas that are to be kept free of the coating of the invention can be masked-off using known means prior to the application of the method's composition and its conversion using some heat or energy source.

In other applications, the metal compound composition may be applied to chosen areas of a component or system and an induction heating element may be passed proximate to the area of interest to create the conversion environment. In some applications, the inner surface of a component may not be visible by line of sight, but an induction wand held proximate to the inside or outside surfaces of the component may allow sufficient heat to be developed on the wetted surfaces being treated with the metal compounds such that the desired oxides are formed by an indirect heating method. This technique would also be possible using infra-red heating from inside or outside of a component, flame heating, or other known heating methods wherein the material of the component can be raised to the desired temperature to ensure the conversion of the metal compounds to oxides. Using this method of indirect heating may also be used with a chosen atmosphere that may be provided proximate to the wetted surfaces of the pipe or component, such as an inert atmosphere made up of argon, as one example, which would serve to prevent undesirable oxides to form on the material surface being treated.

In other applications, multiple coats may be desired such that further protection of the material's surface is provided. To reduce the time between applications of the coating of the invention, cooling methods may be used after each heating cycle to bring the surfaces to the required temperatures prior to subsequent applications of the metal compounds. Such cooling methods may be used that are known to the art such as water spraying, cold vapor purging through the interior of the system, evaporative cooling methods, and others.

Representative coating compositions that have been found to be suitable in embodiments of the present invention include, but are not limited to:

$ZrO_2$ for example, at 0-90 wt %
$CeO_2$ for example, at 0-90 wt %
$CeO_2$—$ZrO_2$ where $CeO_2$ is about 10-90 wt %

$Y_2O_3$ Yttria-stabilized Zirconia where Y is about 1-50% mol %

$TiO_2$ for example, at 0-90 wt %
$Fe_2O_3$ for example, at 0-90 wt %
NiO for example, at 0-90 wt %
$Al_2O_3$ for example, at 0-90 wt %
$SiO_2$
$Y_2O_3$
$Cr_2O_3$
$Mo_2O_3$
$HfO_2$
$La_2O_3$
$Pr_2O_3$
$Nd_2O_3$
$Sm_2O_3$
$Eu_2O_3$
$Gd_2O_3$
$Tb_2O_3$
$Dy_2O_3$
$Ho_2O_3$
$Er_2O_3$
$Tm_2O_3$
$Yb_2O_3$
$Lu_2O_3$ Mixtures of these compositions are also suitable for use in the invention.

Oxides of the following elements also can be used in embodiments of the present invention: Lithium, Beryllium, Sodium, Magnesium, Aluminum, Silicon, Potassium, Calcium, Scandium, Titanium, Vanadium, Chromium, Manganese, Iron, Cobalt, Nickel, Copper, Zinc, Gallium, Germanium, Arsenic, Bromine, Rubidium, Strontium, Yttrium, Zirconium, Niobium, Molybdenum, Technetium, Ruthenium, Rhodium, Palladium, Antimony, Tellurium, Silver, Cadmium, Indium, Tin, Cesium, Barium, Lanthanum, Cerium, Praseodymium, Neodymium, Promethium, Samarium, Europium, Gadolinium, Terbium, Dysprosium, Holmium, Erbium, Thulium, Ytterbium, Lutetium, Hafnium, Tantalum, Tungsten, Rhenium, Osmium, Iridium, Platinum, Gold, Mercury, Thallium, Lead, Bismuth, Radium, Actinium, Thorium, Protactinium, Uranium, Neptunium, Plutonium, Americium, Curium, Berkelium, Californium, Einsteinium, Fermium, Mendelevium, Nobelium, and Lawrencium. Oxides containing more than one of the foregoing elements, and oxides containing elements in addition to the foregoing elements, also can be used in embodiments of the present invention. For example, $SrTiO_3$ and $MgAl_2O_4$ are included. Those materials are likely to form at least in small amounts when appropriate metal compounds are used, depending on the conditions of the conversion process. In some embodiments, the molar ratio of metal compounds deposited on the surface corresponds to the molar ratio of metal oxides after conversion.

The invention relates, in some embodiments, to diffused coatings and thin films (and articles coated therewith) containing at least one rare earth metal oxide, and at least one transition metal oxide. As used herein, "diffused" means that metal oxide molecules, nanoparticles, nanocrystals, larger domains, or more than one of the foregoing, have penetrated the substrate. The diffusion of metal oxides can range in concentration from rare interstitial inclusions in the substrate, up to the formation of materials that contain significant amounts of metal oxide. A thin film is understood to indicate a layer, no matter how thin, composed substantially of metal oxide. In some embodiments, a thin film has very little or no substrate material present, while in other embodiments, a thin film comprises atoms, molecules, nanoparticles, or larger domains of substrate ingredients. In some embodiments, it may be possible to distinguish between diffused portions and thin films. In other embodiments, a gradient may exist in which it becomes difficult to observe a boundary between the diffused coating and the thin film. Furthermore, some embodiments may exhibit only one of a diffused coating and a thin film. Still other embodiments include thin films in which one or more species have migrated from the substrate into the thin film. The terms "metal oxide coating" and "surface comprises at least one metal oxide" include all of those possibilities, including diffused coatings, thin films, stacked thin films, and combinations thereof.

As explained herein, the diffused coating of some embodiments of the invention provides increased performance, in part, because it penetrates the surface of the coated substrate to a depth providing a firm anchor to the material being coated without the need for intermediate bonding layers. In some embodiments, the diffused coating penetrates the substrate to a depth of less than about 100 Angstroms. In other embodiments, the diffused coating penetrates from about 100 Angstroms to about 200 Angstroms, from about 200 Angstroms to about 400 Angstroms, from about 400 Angstroms to about 600 Angstroms, and greater than about 600 Angstroms, and in some embodiments from about 200 to about 600 Angstroms. This diffused coating allows much thinner films [in some embodiments around 0.1 to 1 microns in thickness (or about 0.5 microns when approximately 6 layers are used)] to be applied, and yet may provide equivalent protection to that provided by conventional coating or thin film technologies. This, in turn, allows for thinner films or coatings to be established, reducing significantly the cost of materials attaching to the substrate. Thus, some embodiments of the present invention provide a thin film no thicker than about 5 nm. Other embodiments provide a thin film no thicker than about 10 nm. Still other embodiments provide a thin film no thicker than about 20 nm. Still other embodiments provide a thin film no thicker than about 100 nm. Other embodiments provide a thin film having a thickness less than about 25 microns. Still other embodiments provide a thin film having a thickness less than about 20 microns. Still other embodiments provide a thin film having a thickness less than about 10 microns. Yet other embodiments provide a thin film having a thickness less than about 5 microns. Some embodiments provide a thin film having a thickness less than about 2.5 microns. Even other embodiments provide a thin film having a thickness less than about 1 micron.

In some embodiments of the invention, the metal oxide coating can contain other species, such as, for example, species that have migrated from the substrate into the metal oxide coating. In other embodiments, those other species can come from the atmosphere in which the at least one metal compound is converted. For example, the conversion can be performed in an environment in which other species are provided via known vapor deposition methods. Still other embodiments provide other species present in or derived from the at least one metal compound or the composition comprising the compound. Suitable other species include metal atoms, metal compounds including those metal atoms, such as oxides, carbides, nitrides, sulfides, phosphides, and mixtures thereof, and the like. The inclusion of other species can be accomplished by controlling the conditions during conversion, such as the use of a chosen atmosphere during the heat conversion process, for example, a partial vacuum or atmosphere containing $O_2$, $N_2$, $NH_3$, one or more hydrocarbons, $H_2S$, alkylthiols, $PH_3$, or a combination thereof.

Some embodiments of the present invention provide metal oxide coatings that are substantially free of other species. For example, small amounts of carbides may form along side oxides when, for example, metal carboxylates are converted, if no special measures are taken to eliminate the carbon from the carboxylate ligands. Thus, converting metal compounds in the presence of oxygen gas, air, or oxygen mixed with other gases reduces or eliminates carbide formation in some embodiments of the present invention. Also, rapid heating of the conversion environment, such as, for example, by induction heating, microwave heating, lasers, and other heating methods that can produce the necessary heat levels in a short time, reduces or eliminates formation of other species, in other embodiments. At least one rapid heating technique is used in combination with an oxygen-containing atmosphere in still other embodiments.

Additional embodiments employ various heating steps to reduce or eliminate the formation of other species. For example, carbide formation can be lessened during metal oxide formation in some embodiments by applying a metal compound precursor composition containing a metal carboxylate to a surface, subjecting the surface to a low-temperature bake at about 250° C. under a vacuum, introducing air and maintaining the temperature, and then increasing the temperature to about 420° C. under vacuum or inert atmosphere to convert the metal carboxylate into the metal oxide. Without wanting to be bound by theory, it is believed that the low-temperature bake drives off most or all of the carboxylate ligand, resulting in an oxide film substantially free of metal carbide.

Still other embodiments employ more than one layer to achieve at least one layer substantially without other species. For example, in some embodiments, a base coat of at least one metal oxide is formed from at least one metal carboxylate under an inert atmosphere. Such a base coat may contain metal carbides due to the initial presence of the carboxylate ligands. Moreover, such a base coat may exhibit good adhesion and strength, for example, when the surface comprises a carbon steel alloy. Then, one or more subsequent metal compounds are repeatedly applied and converted in an oxygen-containing atmosphere, for example, and the subsequent layers of metal oxide form substantially without metal carbides. In some embodiments, six or more layers are formed on the base coat.

In addition, the effect of any mismatches in physical, chemical, or crystallographic properties (particularly with regard to differences in thermal expansion coefficients) may be minimized by the use of much thinner coating materials and the resulting films. Furthermore, the smaller crystallite structure of the film (3-6 nanometers, in some embodiments) increases Hall-Petch strength in the film's structure significantly.

In some embodiments, the present invention provides methods of reducing differences in coefficients of thermal expansion between a substrate and a metal oxide coating proximal to the substrate. In some embodiments, methods of reducing differences in coefficients of thermal expansion between a substrate and at least one metal oxide comprise interposing a diffused coating between the substrate and the metal oxide. Interposing such a diffused coating comprises applying at least one metal compound to the substrate, and then at least partially converting the at least one metal compound to at least one metal oxide.

The thermal stability of the metal oxide coating can be tested, in some embodiments, by exposing the coated material to thermal shock. For example, a surface having a metal oxide coating can be observed, such as by microscopy. Then the surface can be exposed to a thermal shock, such as by rapid heating or by rapid cooling. Rapid cooling can be caused by, for example, dunking the room-temperature or hotter surface into liquid nitrogen, maintaining the surface under liquid nitrogen for a time, and then removing the surface from the liquid nitrogen. The surface is then observed again, to look for signs that the metal oxide coating is delaminating, cracking, or otherwise degrading because of the thermal shock. The thermal shock test can be repeated to see how many shock cycles a given metal oxide coating can withstand before a given degree of degradation, if any, is observed. Thus, in some embodiments of the present invention, the at least one metal oxide coating withstands at least one, at least five, at least ten, at least twenty-five, at least fifty, or at least one hundred thermal shock cycles from room temperature to liquid nitrogen temperature.

The nanocrystalline grains resulting from some embodiments of the methods of the present invention have an average size, or diameter, of less than about 50 nm. In some embodiments, nanocrystalline grains of metal oxide have an average size ranging from about 1 nm to about 40 nm or from about 5 nm to about 30 nm. In another embodiment, nanocrystalline grains have an average size ranging from about 10 nm to about 25 nm. In further embodiments, nanocrystalline grains have an average size of less than about 10 nm, or less than about 5 nm.

In other embodiments, the invention relates to metal oxide coatings (whether diffused, thin film, or both diffused and thin film) and articles comprising such coatings, in which the coatings contain two or more rare earth metal oxides and at least one transition metal oxide. Further embodiments of the invention relate to metal oxide coatings (and articles comprising them), containing ceria, a second rare earth metal oxide, and a transition metal oxide. Some embodiments relate to metal oxide coatings (and articles comprising them), containing yttria, zirconia, and a second rare earth metal oxide. In some cases, the second rare earth metal oxide can include platinum or other known catalytic elements.

In some embodiments, the metal compound applied to the surface comprises a cerium compound, and the metal oxide coating comprises cerium oxide (or ceria). In other embodiments, the metal compound applied to the surface comprises a zirconium compound, and the metal oxide coating comprises zirconia. In yet other embodiments, a solution comprising both a cerium compound and a zirconium compound is applied, and the resulting metal oxide coating comprises ceria and zirconia. In some cases, the zirconia formed by the process of the invention comprises crystal grains having an average size of about 3-9 nm, and the ceria formed by the process of the invention comprises crystal grains having an average size of about 9-18 nm. The nanostructured zirconia can be stabilized in some embodiments with yttria or other stabilizing species alone or in combination. In still other embodiments, the metal oxide coating comprises zirconia, yttria, or alumina, each alone or in combination with one or both of the others.

In additional embodiments, the method of the invention further includes a step of applying an organosiloxane-silica composition over the formed oxide coating and exposing the coated substrate to an environment that will remove volatile components from the composition without decomposing organo-silicon bonds. Moreover, other treatments can be performed after the formation of an oxide coating. As explained herein, additional metal oxide coatings, which can be the same or different, can be added. In some embodiments, the metal oxide(s) can be etched, polished, carburized, nitrided, painted, powder coated, plated, or anodized.

In some embodiments, the at least one metal oxide serves as a bond coat for at least one additional coating. Such additional coatings need not be formed according to the present invention. Some embodiments provide a metal oxide bond coat that allows an additional coating that would not adhere to the surface as well in the absence of the bond coat. In addition, the substrate can be subjected to a thermal treatment, either before or after a metal oxide coating is formed on the substrate. For example, a substrate having a metal oxide coating in accordance with the present invention can be annealed at high temperature to strengthen the substrate. In another example, a substrate can be held near absolute zero before or after a metal oxide coating is formed on the substrate. Suitable temperatures for thermal treatment range from nearly 0 K to several thousand K, and include liquid hydrogen, liquid helium, liquid neon, liquid argon, liquid krypton, liquid xenon, liquid radon, liquid nitrogen, liquid oxygen, liquid air, and solid carbon dioxide temperatures, and temperatures obtained by mixtures, azeotropes, and vapors of those and other materials.

The methods of the present invention can be used during or after manufacturing a given component of a fluid processing or transport system. For example, one or more oxide coatings can be applied to a pipe section as it is manufactured, or after the pipe is assembled into a fluid processing or transport system. Moreover, in some embodiments, the methods of the present invention can be incorporated into conventional manufacturing steps. For example, after pipes are welded, often they are subjected to a heat treatment to relieve the stresses introduced by the welding process. In some embodiments of the present invention, at least one metal compound is applied after welding and before that heat treatment. In those embodiments, that one heat treatment converts at least one metal compound into at least one metal oxide and relieves welding-induced stresses.

The process of the invention may permit the use of coatings on a wide variety of materials, including application of $CeO_2$ and $ZrO_2$ coatings to ceramics and/or solid metals previously not thought possible of being coated with these materials. Some embodiments of the present invention provide a relatively low temperature process that does not damage or distort many substrates, does not produce toxic or corrosive water materials, and can be done on site, or "in the field" without the procurement of expensive capital equipment.

Additionally, the nature of the resulting interstitial boundaries of the invention's nanocrystalline structures in various embodiments can be comprised of chosen ingredients so as to increase ionic conductivity while decreasing electron conductivity, or can be comprised of chosen ingredients so as to increase the material's mixed conductivity, or to modify its porosity. In a similar fashion, many other properties may be altered through the judicious selection of various ingredients that are formulated as part of the metal compound composition of the invention.

In some embodiments of the present invention, a substrate which comprises at least a portion of a component's structure is placed within a vacuum chamber, and the chamber is evacuated. Optionally, the substrate can be heated or cooled, for example, with gas introduced into the chamber or by heat transfer fluid flowing through the substrate mounting structure. If a gas is introduced, care should be taken that it will not alter the substrate in an unintended manner, such as by oxidation of a hot iron-containing surface by an oxygen-containing gas. Introduced gas optionally can be evacuated once the substrate achieves the desired temperature. Vapor of one or more metal compounds, such as cerium(IV) 2-hexanoate, enters the vacuum chamber and deposits on the substrate. A specific volume of a fluid composition containing the metal compound can provide a specific amount of compound to the surface of the substrate within the vacuum chamber, depending on the size of the chamber and other factors. Optionally, a chosen gas is vented into the chamber and fills the vacuum chamber to a chosen pressure, in one example, equal to one atmosphere. The chamber is heated to a temperature sufficient to convert at least some of the compounds into oxides, for example, 450° C., for a discrete amount of time sufficient for the conversion process, for example, thirty minutes. In this example, a ceria layer forms on the substrate. Optionally, the process can be repeated as many times as desired, forming a thicker coating of ceria on the substrate. In some embodiments, the component can be cooled relative to ambient temperature, such as, for example, to liquid nitrogen temperature, to aid the deposition process. In other embodiments, a reducing atmosphere may be used to convert at least a portion of the metal oxides to metal.

In other embodiments, the substrate can comprise one or more polymers, such as polyvinyl chloride. The polymer substrate can be kept at lower temperatures sufficient to prevent the degradation of the substrate during the heating process, for example, at liquid nitrogen temperatures while the metal compound converts to the oxide due to any technique that heats the metal compound but not the substrate to a significant degree. Examples of such heating techniques include flash lamps, lasers, and microwave heating. In addition, materials that would become degraded by exposure to high temperatures can be kept at lower temperatures using the same techniques. For example, glasses, low-melting-temperature metals, polycarbonates, and similar substrates can be kept cooler while the at least one metal compound is converted to at least one metal oxide.

As used herein in reference to process gases used to carry out the process of the invention, the term "high temperature" means a temperature sufficiently high to convert the metal compound to metal oxide, generally in the range of about 200° C. to about 1000° C., such as, for example, about 200° C. to about 400° C., or about 400° C. to about 500° C., about 500° C. to about 650° C., about 650° C. to about 800° C., or about 800° C. to about 1000° C. Process gases at even higher temperatures can be used, so that, when the gas is passed through the fluid transport or processing system during the process of some embodiments of the invention, the temperature of the gas exiting the system is within the range given above.

A given embodiment of the invention described herein may involve one or more of several basic concepts. For example, one concept relates to a surface treatment that generally meets above-described technical properties and can be manufactured at a low cost. Another concept relates to a method to form an oxide protective film on the surface of a metal. Another concept relates to a two-step process adapted to form a prophylactic layer onto internal surfaces of a fluid transport or processing system. Another concept relates to creating thin films of nanocrystalline zirconia on surfaces to resist fibrous growth of carbon and other elements. Another concept is related to a means to apply a protective coating to an assembly of various components using a process to heat an enclosed system as a curing method for the coating.

In some embodiments of the invention, an oxidizing coating may be formed on a substrate by applying a liquid metal compound composition to the substrate using a dipping process, spraying, vapor deposition, swabbing, brushing, or other known means of applying a liquid to an internal surface of a pipe, conduit or process equipment. This liquid metal compound composition comprises at least one rare earth metal salt of a carboxylic acid and at least one transition metal salt of a carboxylic acid, in a solvent, in some embodiments. The surface, once wetted with the composition is then exposed to a heated environment that will convert at least some of the metal compounds to metal oxides, thereby forming an oxidizing coating on the substrate.

The metal oxide coatings resulting from the conversion process, such as thin films of nanocrystalline materials, are applied to material substrates to form one or more thin protective layers. Additional applications of the metal compounds followed by conversion environment exposure (e.g., heating the surface through means described above) may be done to create multiple layers of thin film oxides stacked one on another.

The process may be used to create a nanocrystalline structure that comprises an oxygen containing molecule for chosen applications. Alternately, the resulting nanocrystalline structure may comprise a metal containing compound, a metal, a ceramic, or a cermet.

One benefit to some embodiments of the invention is the ability to apply the metal compound composition to an assembled system and then to flush high temperature gases through the system to achieve the conversion process, resulting in a well-dispersed metal oxide coating on all interior surfaces. This is especially beneficial for welded piping systems, heat exchangers, and similar components which use welding for their assembly, said welding typically destroying whatever surface treatments were applied to the pipes, heat exchangers, or other parts prior to welding. The high temperature conditions of the welding process tend to destroy all protective coatings. The invention provides a way to create a final metal oxide coating covering all parts of the process system, creating a protective coating for weld joints and component interiors alike.

To create a less porous thin film, for some embodiments, material may be added to the base fluid to act as filler material. In this way, the porosity of the finished coating is altered through the inclusion of nanoparticles of chosen elements in the liquid metal compound composition prior to the exposure of the composition to an environment that will convert at least a portion of the metal compound(s) into metal oxides. The result is a more dense thin film.

In some applications, where it is desirable to reduce a metal oxide to a pure metal, the treated substrate may be exposed to a reducing agent, such as hydrogen or other known reducing agent using known means for oxide reduction. For example, 7% hydrogen in argon heated to 350° C. can be used to form platinum in certain embodiments. Other metals that may be desired, such as for catalytic purposes, for example, include but are not limited to platinum, palladium, rhodium, nickel, cerium, gold, silver, zinc, lead, rhenium, ruthenium, and combinations of two or more thereof.

INDUSTRIAL APPLICABILITY

As described above, the method of the invention may be used to provide prophylactic coatings to internal surfaces of fluid transport or processing systems, and has particular utility in the area of fluid transport or processing systems in the petroleum and natural gas industries, where carbon fouling, corrosion, and hydrogen embrittlement are particular problems in pipelines and processing equipment. For example, coating with the ceria, or yttria-stabilized zirconia, or a combination of ceria and zirconia will significantly reduce carbon fouling on steel surfaces exposed to petroleum or other hydrocarbons at temperatures of around 570° C., in effect providing protection against any effective or measurable carbon deposition. Uncoated steel surfaces exposed to similar conditions become sufficiently fouled with carbon as to require cleaning after about 18 months of service. Inhibition of carbon fouling occurs during exposure to petroleum or other hydrocarbons at temperatures as high as 900° C. Similar improvement in fouling will occur in fluid processing systems used to process natural gas.

In addition to protection against carbon fouling, the method of the invention provides protection against other fouling and corrosion problems often encountered in chemical or hydrocarbon processing operations in various embodiments. For example, the method of the invention provides a partial or full barrier against the intrusion of hydrogen into a metal substrate, reducing surface and substrate degradation through this known mechanism, in some embodiments. In particular, the method of the invention provides an effective barrier against corrosive attack in further embodiments. Because the resulting surface coating provides an effective barrier between the material of the process equipment (typically metal, such as iron or steel) and the environment (e.g., a crude oil, cracked hydrocarbon, or natural gas stream), electrochemical and other reactions between the metal and the process stream are effectively reduced or prevented in still other embodiments. This is particularly important for stainless steel piping systems, where the high temperatures involved in welding of the steel causes chromium (the primary passivating element in stainless steel) to migrate to grain boundaries, creating a galvanic couple between high Cr and low Cr areas, which can lead to corrosive attack. Because the method of the invention allows application of the coating after the welds have been formed (and any high temperature damage has occurred) in some embodiments, areas of the system adjacent to the weld are insulated from exposure to the potentially corrosive environment of the fluid being processed.

Exposure to certain types of welding, galvanic corrosion, and more importantly hydrogen sulfide (often found in petroleum and natural gas process streams) can introduce hydrogen into the crystal lattice of the metal process equipment, leading to embrittlement and cracking. The method of the invention, by preventing exposure of the metal to any hydrogen or hydrogen sulfide contained in the process stream, can reduce or eliminate this form of attack in certain embodiments of the present invention.

Other systems can be protected from various forms of fouling as well. The heat exchangers that can be protected according to various embodiments of the present invention include any kind of heat exchanger. Known heat exchangers pass thermal energy, whether for heating or cooling purposes, for example, between gases, between a gas and a liquid, between liquids, between a liquid and a solid, and between a gas and a solid. Heat exchangers for two-phased, semi-solid, paste and slurry systems are also known. Heat exchangers include, for example, oil refinery heating units, cooling towers, automobile radiators, HVAC systems such as air conditioners, solar towers, geothermal harvesters, refrigeration units, and the like.

The materials that can be protected from fouling according to the present invention include any material that can receive a protective coating of a metal oxide. Such materials include, for example, metals, ceramics, glasses, and cermets, as well as composites and polymers that can withstand the process conditions for converting the metal carboxylate into metal oxide. The metals that can be protected include, but are not limited to, substantially pure metals, alloys, and steels, such as, for example, low alloy steels, carbon steels, stainless steels, 300 series stainless steel, 400 series stainless steel, nickel base alloys, high-chromium steels, and high-molybdenum steels.

The industrial and commercial products that can be protected according to the present invention are not limited. Petroleum refinery; petrochemical processing; petroleum transport and storage such as pipelines, oil tankers, fuel transport vehicles, and gas station fuel tanks and pumps; sensors; industrial chemical manufacture, storage, and transportation; automotive fluid systems including fuel systems, lubrication systems, radiators, air heaters and coolers, break systems, power steering, transmissions, and similar hydraulics systems; aeronautical and aerospace fluid storage and transport systems including fuel systems and hydraulic systems; and food and dairy processing systems; combustion engines, turbine engines, and rocket engines; among many others, can benefit from the present invention.

EXAMPLES

Example 1

Five 2"×2" coupons of mirror-finish SS304 steel (McMaster-Carr) were individually designated "Uncoated," "Zircon," "Glass," "YSZ," and "Clay." Those compositions mimic chemically and thermally inert materials by the same names known in nature and industry, in an inventive manner. A wide range of similar materials can suggest additional compositions to be used as embodiments of the present invention. The "Uncoated" coupon was given no coating, to function as the control. Each of the other coupons were coated on one side with the following compositions in accordance with embodiments of the present invention:

Zircon: Zirconium 2-ethylhexanoate (28% wt. of the final composition, Alfa-Aesar), silicon 2-ethylhexanoate (33.5% wt., Alfa-Aesar) and chromium 2-ethylhexanoate (1% wt., Alfa-Aesar) were mixed into 2-ethylhexanoic acid (37.5% wt., Alfa-Aesar), and the composition was spin-coated onto the steel substrate.

Glass: Silicon 2-ethylhexanoate (74% wt., Alfa-Aesar), sodium 2-ethylhexanoate (5.2% wt., Alfa-Aesar), calcium 2-ethylhexanoate (11% wt., Alfa-Aesar), and chromium 2-ethylhexanoate (1.4% wt., Alfa-Aesar) were mixed into 2-ethylhexanoic acid (8.4% wt., Alfa-Aesar), and the composition was spin-coated onto the steel substrate.

YSZ: Yttrium 2-ethylhexanoate powder (2.4% wt., Alfa-Aesar) was dissolved into 2-ethylhexanoic acid (60% wt., Alfa-Aesar) with stirring at 75-80° C. for one hour. Once the composition was cooled to room temperature, zirconium 2-ethylhexanoate (36.6% wt., Alfa-Aesar) and chromium 2-ethylhexanoate (1% wt., Alfa-Aesar) were mixed in. The composition was spin-coated onto the steel substrate.

Clay: Aluminum 2-ethylhexanoate (15% wt., Alfa-Aesar), silicon 2-ethylhexanoate (45% wt., Alfa-Aesar), and chromium 2-ethylhexanoate (2% wt., Alfa-Aesar) were mixed into 2-ethylhexanoic acid. This composition was hand-brushed onto the substrate, due to the viscosity of the composition. The composition apparently reacted with moisture in the air and began to solidify, making application difficult.

The coated steel coupons were placed in a vacuum oven, and evacuated to about 20-60 millitorr. The coupons were heated to 450° C., and then allowed to cool to room temperature. The process of depositing and heating was repeated to apply eight coatings of the appropriate composition on each coupon.

Each coated coupon was assembled into a test cell having a glass cylinder (1" inner diameter×1.125" tall) clamped to the coated portion of the coupon. A rubber gasket formed a seal between the glass cylinder and the coupon. Aqua Regia was prepared from $HNO_3$ (1 part, by vol., 70%, stock #33260, Alfa-Aesar) and HCl (3 parts, by vol., ~37%, stock #33257, Alfa-Aesar), poured into the glass cylinder, and allowed to contact the coupon for one hour. Then, the coupon was removed, rinsed, and photographed. The photographs of the tested coupons appear in FIGS. 2-6.

Aqua Regia, so-called because it is known to dissolve noble metals such as gold and platinum, severely etched the Uncoated stainless steel coupon. See FIG. 2. The Zircon coupon, in contrast, remains largely unetched, showing only small spots. See FIG. 3. The Glass coupon also remains largely unetched, showing feint scratch-like features. See FIG. 4. The YSZ coupon shows significant etching. See FIG. 5. The Clay coupon also shows etching, although less severe than the Uncoated coupon. See FIG. 6.

On a scale of 0-10, with 0 representing severe etching and 10 representing complete protection, the coatings exhibited the following performance:

| Coupon | Performance |
| --- | --- |
| Uncoated | 0 |
| Zircon | 8 |
| Glass | 7-8 |
| YSZ | 0-1 |
| Clay | 0-1 |

Observation of the Zircon and Glass coupons at magnifications of 100× to 1,000× before exposure to Aqua Regia revealed uniform, non-porous, mostly amorphous coatings. Observation of the YSZ coupon at those same magnifications revealed a surface coating having a crystalline structure. Observation of the Clay coupon revealed uneven coverage, likely due to the humidity-catalyzed reaction and premature solidification. Preparation and application of the Clay composition in a moisture and/or oxygen-free environment may improve the Clay coating's characteristics and performance.

These results demonstrate protection of a steel substrate in a highly-corrosive environment by coatings prepared in accordance with the present invention. These results also demonstrate easy experiments for testing metal oxide coatings to assess how they might perform in a given environment.

Similar experiments can be done in other environments to determine how metal oxide coatings might perform in those environments. The skilled artisan will recognize that compositions that did not perform well against Aqua Regia may perform well in other environments. For example, it is believed that the YSZ coating reduces or prevents coke buildup. Furthermore, a composition's performance depends in part on the application and conversion conditions. For example, the Clay composition is expected to perform well if it is applied and converted in a suitable environment, as discussed above.

Example 2

Figure 7:
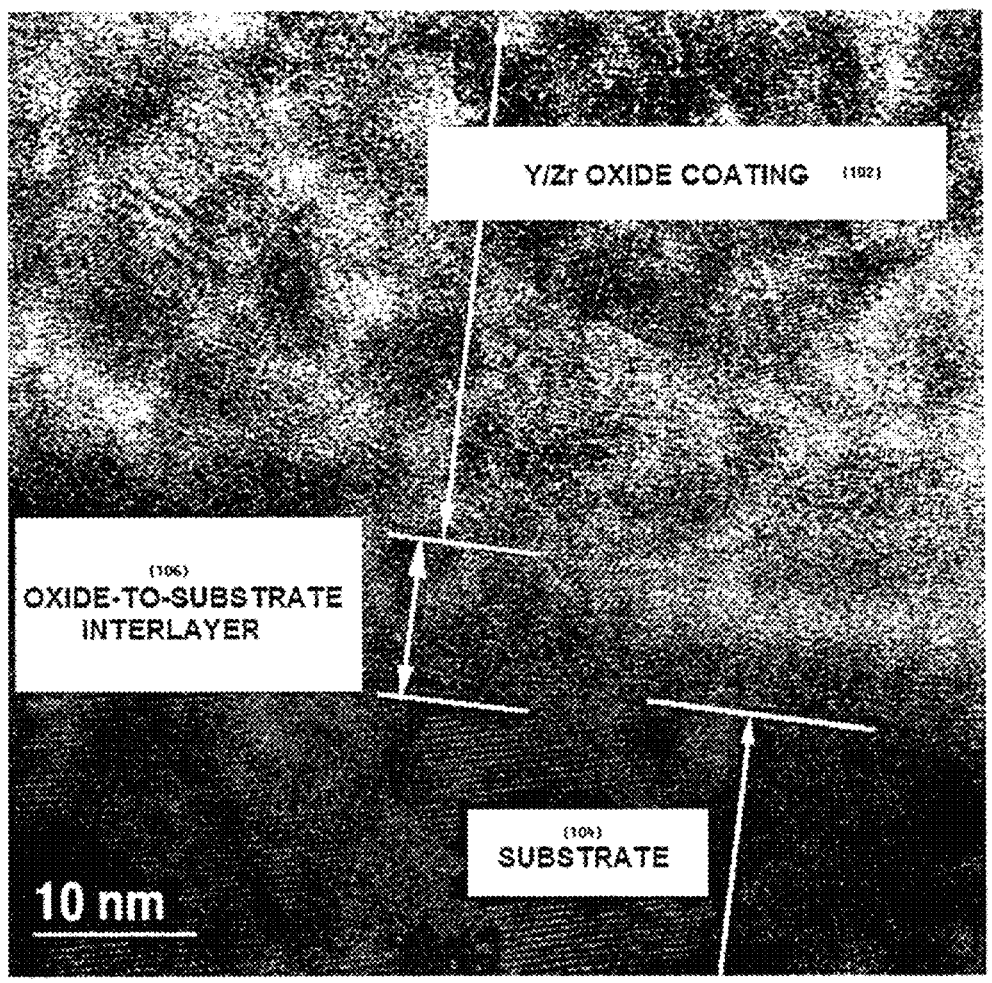
FIG. 7 shows TEM micrograph at 10,000× magnification of a steel substrate having a Y/Zr oxide coating in cross-section.

FIG. 7 shows a TEM micrograph at 10,000× magnification of a stainless steel SS304 substrate (104) having eight coats of an yttria/zirconia composition (102). The figure illustrates a diffused coating, labeled Oxide-To-Substrate Interlayer (106). In this example, the diffused coating is about 10 nm thick. The TEM also shows crystal planes, indicating the nanocrystalline nature of the yttria/zirconia.

Example 3

The interior oil-contacting surfaces of a boiler for a petroleum fractional distillation column are cleaned and then flushed with a well-stirred room temperature composition containing cerium(III) 2-ethylhexanoate (203 g; all weights are per kilogram of final composition), chromium(III) acetylacetonate (10.1 g), and cerium(IV) oxide nanoparticles (10.0 g, 10-20 nm, Aldrich) in 2-ethylhexanoic acid (777 g), and the composition is drained from the boiler. Steam at 500° C. heats the boiler in the usual manner for 30 minutes, and then the boiler is allowed to cool. A substantially non-porous cerium oxide coating stabilized by chromium oxide forms on the oil-contacting surfaces of the boiler.

Example 4

Under an ethanol-saturated nitrogen atmosphere, the cleaned milk-contacting surfaces of a milk pasteurizer are flushed with a well-stirred composition containing titanium (IV) ethoxide in ethanol (500 g, 20% Ti, Aldrich) and dry ethanol (500 g), and the composition is drained. Dry nitrogen heated to 450° C. flushes through the pasteurizer for fifteen minutes, and the pasteurizer is allowed to cool under a flow of room-temperature nitrogen. Analysis will reveal a titanium dioxide coating on the milk-contacting surfaces of the pasteurizer.

Example 5

A clean automobile exhaust manifold is dipped in a stirred bath containing a first composition that contains zirconium (IV) 2,2,6,6-tetramethyl-3,5-heptanedionate (459 g), yttrium (III) 2,2,6,6-tetramethyl-3,5-heptanedionate (72.9 g), and hexanes (to 1 kg) so the composition contacts interior and exterior surfaces. Optionally, openings can be plugged so the first composition does not contact the interior surfaces. The manifold is removed from the composition, suspended, and rotated to allow excess composition to drip into the bath. Microwave radiation irradiates exterior surfaces for ten minutes, and an yttria-stabilized zirconia coating forms on the exterior of the manifold. The exhaust-contacting surfaces of the manifold are flushed with a second composition containing zirconium(IV) 2,2,6,6-tetramethyl-3,5-heptanedionate (459 g), yttrium(III) 2,2,6,6-tetramethyl-3,5-heptanedionate (72.9 g), platinum(II) acetylacetonate (1.01 g), and hexanes (to 1 kg), and the composition is drained from the manifold. Argon gas heated to 450° C. is passed through the interior of the manifold for 30 minutes. Then, argon gas containing 7% hydrogen heated to 350° C. passes through the interior of the manifold for 30 minutes. An yttria-stabilized zirconia coating will form on the interior surface of the manifold. The interior surface also will contain platinum metal sites to catalyze the oxidation of partially-combusted hydrocarbon fuel. Moreover, an yttria-stabilized zirconia coating will form to protect the exterior of the manifold from corrosion. Optionally, the manifold can be cooled to room temperature and then slowly lowered into a liquid nitrogen bath for a time.

Embodiments

Embodiment 1. A method for forming at least one metal oxide on a surface of a fluid processing or transport system, or a component thereof, comprising:
at least partially assembling the system;
applying at least one metal compound to the surface;
exposing the surface with the applied at least one metal compound to an environment that will convert at least some of the compound to at least one metal oxide.

Embodiment 2. The method of embodiment 1 wherein the at least one metal compound comprises at least one metal carboxylate, at least one metal alkoxide, at least one metal β-diketonate, or a combination of any of the foregoing.

Embodiment 3. The method of embodiment 1, wherein the at least one metal oxide is etched, polished, carburized, nitrided, painted, powder coated, plated, anodized, has one or more elements deposited alone or in combination, or is subjected to more than one of the foregoing.

Embodiment 4. The method of embodiment 1, wherein the surface is subjected to at least one thermal treatment, before, after, or both before and after exposing the surface with the applied at least one metal compound.

Embodiment 5. A method for decreasing or preventing fouling on a surface of a fluid processing or transport system, or a component thereof, comprising:
applying at least one metal compound to the surface; and
exposing the surface with the applied at least one metal compound to an environment that will convert at least some of the compound to at least one metal oxide;
wherein the at least one metal oxide is resistant to fouling.

Embodiment 6. The method of embodiment 5, wherein the at least one metal compound comprises at least one metal carboxylate, at least one metal alkoxide, at least one metal β-diketonate, or a combination of any of the foregoing.

Embodiment 7. The method of embodiment 5, wherein the at least one metal oxide comprises at least one metal oxide chosen from the oxides of:
Lithium, Beryllium, Sodium, Magnesium, Silicon, Potassium, Calcium, Gallium, Germanium, Arsenic, Bromine, Rubidium, Strontium, Technetium, Ruthenium, Rhodium, Palladium, Indium, Tin, Antimony, Tellurium, Cesium, Barium, Tantalum, Tungsten, Rhenium, Osmium, Iridium, Gold, Mercury, Thallium, Lead, Bismuth, Radium, Actinium, Thorium, Protactinium, Uranium, Neptunium, Plutonium, Americium, Curium, Berkelium, Californium, Einsteinium, Fermium, Mendelevium, Nobelium, Lawrencium, and combinations thereof.

Embodiment 8. The method of embodiment 5, wherein the at least one metal oxide comprises at least one metal oxide chosen from the oxides of:
Aluminum, Scandium, Titanium, Vanadium, Chromium, Manganese, Iron, Cobalt, Nickel, Copper, Zinc, Yttrium, Zirconium, Niobium, Molybdenum, Silver, Cadmium, Lanthanum, Cerium, Praseodymium, Neodymium, Promethium, Samarium, Europium, Gadolinium, Terbium, Dysprosium, Holmium, Erbium, Thulium, Ytterbium, Lutetium, Hafnium, Platinum, and combinations thereof Embodiment 9. The method of embodiment 5, wherein the at least one metal compound is present in a metal compound composition that further comprises at least one nanoparticle.

Embodiment 10. The method of embodiment 9, wherein the at least one nanoparticle is chosen from $Al_2O_3$, $CeO_2$, $Ce_2O_3$, $TiO_2$, $ZrO_2$, and combinations of two or more of the foregoing.

Embodiment 11. The method of embodiment 5, further comprising pretreating the surface before applying the at least one metal compound.

Embodiment 12. A method for decreasing or preventing fouling of a surface of a sensor, or a component thereof, comprising:
applying at least one metal compound to the surface; and
exposing the surface with the applied at least one metal compound to an environment that will convert at least some of the compound to at least one metal oxide:
wherein the at least one metal oxide is resistant to fouling.

Embodiment 13. A method of reducing or preventing coke buildup on a surface of a fluid processing or transport system, or a component thereof, comprising:
applying at least one metal compound to the surface; and
exposing the surface with the applied at least one metal compound to an environment that will convert at least some of the compound to at least one metal oxide;
wherein the at least one metal oxide is resistant to coke buildup.

Embodiment 14. A method for reducing or preventing corrosive attack on a surface of a fluid processing or transport system, or a component thereof, comprising:
applying at least one metal compound to the surface; and
exposing the surface with the applied at least one metal compound to an environment that will convert at least some of the compound to at least one metal oxide;
wherein the at least one metal oxide is resistant to corrosive attack.

Embodiment 15. A method for reducing or preventing combustion buildup on a flame-heated surface of a fluid processing or transport system, or a component thereof, comprising:
applying at least one metal compound to the surface; and
exposing the surface with the applied at least one metal compound to an environment that will convert at least some of the compound to at least one metal oxide;
wherein the at least one metal oxide is resistant to combustion buildup.

Embodiment 16. A method for reducing or preventing fouling of at least one metal surface of a combustion engine system or a component thereof, comprising:
applying at least one metal compound to the surface; and
exposing the surface with the applied at least one metal compound to an environment that will convert at least some of the compound to at least one metal oxide;
wherein the at least one metal oxide is resistant to fouling.

Embodiment 17. An article of manufacture adaptable to provide a surface of a fluid processing or transport system, or a component thereof, wherein the surface comprises:
at least one metal oxide, wherein at least some of the at least one metal oxide is present in a diffused coating.

Embodiment 18. The article of embodiment 17, wherein the surface is an interior surface of a fluid processing or transport system or a component thereof.

Embodiment 19. The article of embodiment 17, wherein the surface comprises at least part of a hydrocarbon-contacting surface of an oil refining system.

Embodiment 20. The article of embodiment 17, wherein the article provides at least part of a heat exchanger.

Embodiment 21. The article of embodiment 17, wherein the thin film comprises more than one layer.

Embodiment 22. The article of embodiment 17, wherein at least some of the at least one metal oxide is present in an oxidizing coating.

Embodiment 23. The article of embodiment 17, wherein at least some of the at least one metal oxide is present in a thin layer of a nanocrystalline coating.

Embodiment 24. The article of embodiment 17, wherein the at least one metal oxide comprises:
at least one rare earth metal oxide, and
at least one transition metal oxide.

Embodiment 25. The article of embodiment 17, wherein the surface comprises at least two rare earth metal oxides.

Embodiment 26. The article of embodiment 17, wherein the surface comprises ceria.

Embodiment 27. The article of embodiment 17, wherein the surface comprises yttria and zirconia.

Embodiment 28. The article of embodiment 17, wherein the surface comprises ceria and zirconia.

Embodiment 29. The article of embodiment 17, wherein the surface comprises yttria, zirconia, alumina, or a combination of two or more of the foregoing.

Embodiment 30. The article of embodiment 17, wherein the at least one metal oxide is chosen from $ZrO_2$, $CeO_2$, $Y_2O_3$, $TiO_2$, $Fe_2O_3$, $NiO$, $Al_2O_3$, $Cr_2O_3$, $Mo_2O_3$, $HfO_2$, $La_2O_3$, $Pr_2O_3$, $Nd_2O_3$, $Sm_2O_3$, $Eu_2O_3$, $Gd_2O_3$, $Tb_2O_3$, $Dy_2O_3$, $Ho_2O_3$, $Er_2O_3$, $Tm_2O_3$, $Yb_2O_3$, $Lu_2O_3$, and combinations of two or more of the foregoing.

Embodiment 31. The article of embodiment 17, wherein the surface comprises platinum, palladium, rhodium, nickel, cerium, gold, silver, zinc, lead, rhenium, ruthenium, chrome, tin, or a combination of two or more of the foregoing.

As previously stated, detailed embodiments of the present invention are disclosed herein; however, it is to be understood that the disclosed embodiments are merely exemplary of the invention that may be embodied in various forms. It will be appreciated that many modifications and other variations that will be appreciated by those skilled in the art are within the intended scope of this invention as claimed below without departing from the teachings, spirit, and intended scope of the invention. Furthermore, the foregoing description of various embodiments does not necessarily imply exclusion. For example, "some" embodiments may include all or part of "other" and "further" embodiments within the scope of this invention.

We claim:

1. A method for decreasing or preventing fouling on an interior surface of a pipe or tube of a fluid processing or transport system, comprising:
applying at least one metal compound composition to the surface with a pig train,
wherein the at least one metal compound composition comprises
zirconium 2-ethylhexanoate,
chromium 2-ethylhexanoate,
silicon 2-ethylhexanoate, and
2-ethylhexanoic acid; and
exposing the surface with the applied at least one metal compound composition to an environment that will convert at least some of the zirconium 2-ethylhexanoate, at least some of the chromium 2-ethylhexanoate, and at least some of the silicon 2-ethylhexanoate to at least one metal oxide;
wherein the at least one metal oxide is resistant to fouling.

2. The method of claim 1, wherein at least a portion of the at least one metal oxide is present in a diffused coating.

3. The method of claim 2, wherein the diffused coating penetrates the surface from about 200 Angstroms to about 600 Angstroms.

4. The method of claim 1, wherein the interior surface of the pipe or tube of the fluid processing or transport system has a surface area greater than 100 square feet.

5. The method of claim 1, wherein the interior surface of the pipe or tube of the fluid processing or transport system has a surface area ranging from 100 square feet to 100,000 square feet.

6. The method of claim 1, wherein the interior surface of the pipe or tube of the fluid processing or transport system has a surface area ranging from 100,000 square feet to 1,000,000 square feet.

7. The method of claim 4, wherein the fluid processing or transport system is a pipeline.

8. The method of claim 4, wherein the fluid processing or transport system is an ethylene cracker.

9. The method of claim 1, wherein the at least one metal compound composition comprises zirconium 2-ethylhexanoate in an amount of 28% wt.

10. The method of claim 1, wherein the at least one metal compound composition comprises chromium 2-ethylhexanoate in an amount of 1% wt.

11. The method of claim 1, wherein the at least one metal compound composition comprises silicon 2-ethylhexanoate in an amount of 33.5% wt.

12. The method of claim 1, wherein the at least one metal compound composition comprises 2-ethylhexanoic acid in an amount of 37.5% wt.

13. The method of claim 1, wherein the at least one metal compound composition comprises
zirconium 2-ethylhexanoate in an amount of 28% wt.,
chromium 2-ethylhexanoate in an amount of 1% wt.,
silicon 2-ethylhexanoate in an amount of 33.5% wt., and
2-ethylhexanoic acid in an amount of 37.5% wt.

14. The method of claim 1, wherein the surface comprises steel.

15. The method of claim 4, wherein the surface comprises stainless steel.

16. The method of claim 5, wherein the surface comprises SS304 steel.

17. The method of claim 1, wherein the exposing comprises heating the surface to 450° C.

18. The method of claim 1, wherein the environment comprises a vacuum of about 20-60 millitorr.

19. The method of claim 1, wherein the applying and the exposing are repeated at least once.

20. The method of claim 19, wherein the applying and the exposing are performed a total of eight times.

* * * * *